United States Patent
Hahn et al.

(10) Patent No.: US 10,795,827 B2
(45) Date of Patent: Oct. 6, 2020

(54) ADAPTIVE MANAGEMENT OF INTERMEDIATE STORAGE

(71) Applicant: Western Digital Technologies, Inc., San Jose, CA (US)

(72) Inventors: Judah Gamliel Hahn, Ofra (IL); Alexander Bazarsky, Holon (IL); Shay Benisty, Beer Sheva (IL); Ariel Navon, Revava (IL)

(73) Assignee: Western Digital Technologies, Inc., San Jose, CA (US)

(*) Notice: Subject to any disclaimer, the term of this patent is extended or adjusted under 35 U.S.C. 154(b) by 21 days.

(21) Appl. No.: 15/816,204

(22) Filed: Nov. 17, 2017

(65) Prior Publication Data
US 2019/0155749 A1     May 23, 2019

(51) Int. Cl.
*G06F 12/126*     (2016.01)
*G06F 12/0804*    (2016.01)

(52) U.S. Cl.
CPC ........ *G06F 12/126* (2013.01); *G06F 12/0804* (2013.01); *G06F 2212/1024* (2013.01); *G06F 2212/2022* (2013.01); *G06F 2212/222* (2013.01)

(58) Field of Classification Search
CPC ............... G06F 12/126; G06F 12/0804; G06F 2212/1024; G06F 2212/2022; G06F 2212/222
USPC ........................................................ 711/103
See application file for complete search history.

(56) References Cited

U.S. PATENT DOCUMENTS

| | | | |
|---|---|---|---|
| 5,930,167 A | 7/1999 | Lee et al. | |
| 8,111,548 B2 | 2/2012 | Mokhlesi | |
| 8,205,063 B2 | 6/2012 | Sinclair | |
| 9,176,864 B2 | 11/2015 | Gorobets et al. | |
| 9,495,101 B2 | 11/2016 | Lieber | |
| 9,703,816 B2 | 7/2017 | George et al. | |
| 2009/0172211 A1 | 7/2009 | Perry | |
| 2009/0300269 A1* | 12/2009 | Radke | G06F 12/0246 711/103 |
| 2011/0010514 A1* | 1/2011 | Benhase | G06F 3/061 711/162 |
| 2013/0173844 A1* | 7/2013 | Chen | G06F 12/0246 711/103 |
| 2013/0282960 A1 | 10/2013 | Kannappan et al. | |
| 2014/0101389 A1 | 4/2014 | Nellans et al. | |

(Continued)

*Primary Examiner* — Gautam Sain
(74) *Attorney, Agent, or Firm* — Vierra Magen Marcus LLP

(57) ABSTRACT

Storage devices that can perform adaptive management of intermediate storage memory, and methods for use therewith, are described herein. Such a storage device includes non-volatile memory, wherein a portion thereof is designated as intermediate storage (IS) memory and another portion thereof designated as main storage (MS) memory. The IS memory has lower write and read latencies, greater endurance, and lower storage density and capacity than the MS memory. In certain embodiments, a host activity pattern is predicted, a relocation schemes is selected based on the predicted host activity pattern, and the selected relocation scheme is executed to thereby selectively relocate one or more portions of the data from the IS memory to the MS memory in accordance with the selected relocation scheme. The relocation scheme that is selected and executed can change over time. Additionally relocation schemes can be generated based on activity log(s) and thereafter selected for execution.

20 Claims, 12 Drawing Sheets

(56) References Cited

U.S. PATENT DOCUMENTS

| | | |
|---|---|---|
| 2014/0164681 A1 | 6/2014 | Ravimohan et al. |
| 2015/0199268 A1* | 7/2015 | Davis .................. G06F 12/0246 |
| | | 711/103 |
| 2015/0213896 A1* | 7/2015 | Lieber ..................... G06F 3/061 |
| | | 711/103 |
| 2015/0355837 A1* | 12/2015 | Bish ........................ G06F 3/061 |
| | | 711/114 |
| 2016/0124668 A1 | 5/2016 | Inbar et al. |
| 2017/0139833 A1* | 5/2017 | Barajas Gonzalez ......................... |
| | | G06F 12/0862 |
| 2017/0255556 A1* | 9/2017 | Peng ..................... G06F 12/126 |

* cited by examiner

| Host Activity Ref # | Operation | Time Stamp | LBA(s) |
|---|---|---|---|
| 1 | Write | t1 | LBAs 100 to 199 |
| 2 | Read | t2 | LBA 100-103 |
| 3 | Read | t3 | LBA 104-106 |
| 4 | Read | t4 | LBA 107-110 |
| . | . | . | . |
| 31 | Read | t31 | LBA 193-196 |
| 32 | Read | t32 | LBA 197-199 |
| 33 | Erase | t33 | LBA 100 to 199 |
| 34 | Write | t34 | LBAs 100 to 199 |
| 35 | Read | t35 | LBA 100-103 |
| 36 | Read | t36 | LBA 104-106 |
| 37 | Read | t37 | LBA 107-110 |
| . | . | . | . |
| 66 | Read | t66 | LBA 193-196 |
| 67 | Read | t67 | LBA 197-199 |
| 68 | Erase | t68 | LBA 100 to 199 |
| 69 | Write | t69 | LBAs 100 to 199 |
| 70 | Read | t70 | LBA 100-103 |
| 71 | Read | t71 | LBA 104-106 |
| 72 | Read | t72 | LBA 107-110 |
| . | . | . | . |
| 100 | Read | t100 | LBA 193-196 |
| 101 | Read | t101 | LBA 197-199 |
| 102 | Erase | t102 | LBA 100 to 199 |
| . | . | . | . |

FIG. 9

| Host Activity Ref # | Operation | Time Stamp | LBA(s) |
|---|---|---|---|
| 1 | Write | t1 | LBAs 0 to 99 |
| 2 | Read | t2 | LBA 3 |
| 3 | Read | t3 | LBA 5 |
| 4 | Write | t4 | LBAs 100 to 199 |
| 5 | Read | t5 | LBA 103 |
| 6 | Read | t6 | LBA 105 |
| 7 | Write | t7 | LBAs 200 to 299 |
| 8 | Read | t8 | LBA 203 |
| 9 | Read | t9 | LBA 205 |
| 10 | Write | t10 | LBAs 300 to 399 |
| 11 | Read | t11 | LBA 303 |
| 12 | Read | t12 | LBA 305 |
| 13 | Write | t13 | LBAs 400 to 499 |
| 14 | Read | t14 | LBA 403 |
| 15 | Read | t15 | LBA 405 |
| 16 | Write | t16 | LBAs 500 to 599 |
| 17 | Read | t17 | LBA 503 |
| 18 | Read | t18 | LBA 505 |
| . | . | . | . |
| . | . | . | . |
| . | . | . | . |

*FIG. 10*

ADAPTIVE MANAGEMENT OF INTERMEDIATE STORAGE

BACKGROUND

A storage device that includes non-volatile memory may include a portion of the non-volatile memory that is designated as intermediate storage (IS) memory and another portion of the non-volatile memory that is designated as main storage (MS) memory. The IS memory is used in storage devices to provide for faster write throughput, and may also be used as a safe-zone to quickly store host data prior to storing the host data in the MS. The IS memory may also function as a non-volatile memory cache that enables hot data stored within the IS memory to be accessed very quickly. The general concept is to use more expensive non-volatile memory that has lower write and read latencies, greater endurance, and lower storage density and capacity as the IS memory, and use less expensive non-volatile memory that has higher write and read latencies, lower endurance, and higher storage density and capacity as the MS memory. The more expensive IS memory, which will likely take up less than ten percent of a total storage budget of a storage device, can include single-level cell (SLC) memory wherein a single bit of data is stored per memory cell. The IS memory can alternatively, or additionally, include storage class memory (SCM). By contrast, the less expensive MS memory, which will likely take up more than ninety percent of the total storage budget, can include multi-level cell (MLC) memory wherein two or more bits are stored per memory cell. MLC memory, as the term is being used herein, can include memory cells wherein two, three or four bits of data, or potentially even more than four bits of data, are being stored per memory cell. Accordingly, as the term is being used herein, the term MLC memory also encompasses triple-level cell (TLC) memory and quad-level cell (QLC) memory.

The process of transferring data from the IS memory to the MS memory is called "relocation." Relocation is performed in order to clear space within the IS memory. While the IS memory is generally superior in both performance and endurance, it is too small to effectively cache all host data. Conventional techniques for performing relocation are typically based on simple heuristics, such as first-in first-out (FIFO), or based on an aging algorithm. However, conventional techniques for performing relocation, which can also be referred to as conventional relocation schemes, are not optimal for many use cases, as there is a clear distinction between what would be an optimal relocation scheme for use in a storage device that is being used for streaming videos, and what would be an optimal relocation scheme for use in a storage device that is being used for repeatedly updating a same relatively small chunk of data. The streaming videos example is an extreme use case, where an entire flash drive is written and then rewritten immediately, time after time. The repeatedly updating of a same relatively small chunk of data, is another extreme use case on the other end of the spectrum, where a same logical block address (LBA) may be written over and over again.

In different scenarios, a storage device may run out of IS memory while it is still needed, which could reduce write throughput, and is generally undesired. However, read latency from the IS memory is also shorter than from the MS memory. Hence it makes sense to avoid relocating a chunk of data from IS memory to MS memory where that chunk of data will be read shortly after being written, as its read latency would be lower if it is kept in the IS memory.

BRIEF DESCRIPTION OF THE DRAWINGS

FIG. 9 illustrates a first exemplary activity log based on which a host activity pattern can be predicted, and the predicted host activity pattern can be used to select a relocation scheme.

FIG. 10 illustrates a second first exemplary activity log based on which a host activity pattern can be predicted, and the predicted host activity pattern can be used to select a relocation scheme.

DETAILED DESCRIPTION

Figure 1:
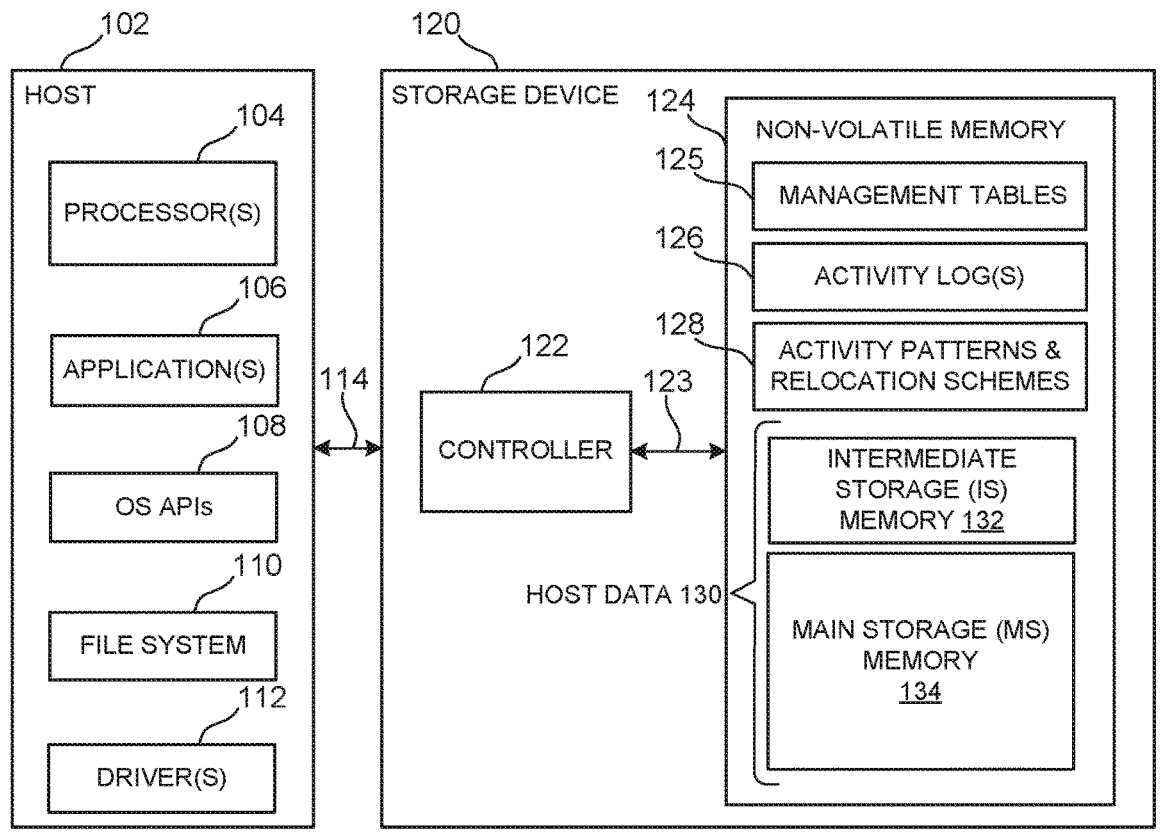
FIG. 1 is a block diagram depicting one embodiment of a storage device connected to a host device (or embedded in the host device) that can implement embodiments of the present technology described herein.

Storage devices that can perform adaptive management of intermediate storage memory, and methods for use therewith, are described herein. Such a storage device can include non-volatile memory, wherein a portion of the non-volatile memory is designated as intermediate storage (IS) memory and another portion of the non-volatile memory is designated as main storage (MS) memory. The IS memory has lower write and read latencies, greater endurance, and lower storage density and capacity than the MS memory. For example, the IS memory can include single-level cell (SLC)

type flash memory wherein a single bit of data is stored per memory cell, and the MS memory can include multi-level cell (MLC) type flash memory wherein two or more bits of data are stored per memory cell. In accordance with certain embodiments of the present technology, which are described in additional detail below, a plurality of relocation schemes are stored, each of which is associated with one of a plurality of potential host activity patterns. Additionally, an activity log is maintained that keeps track of operations related to data stored in the non-volatile memory, and a host activity pattern is predicted based on the activity log. In accordance with certain embodiments, one of the plurality of stored relocation schemes is selected to apply to data stored in the IS memory, wherein the selecting is performed based on the predicted host activity pattern. The selected relocation scheme is then executed to thereby selectively relocate one or more portions of data from the IS memory to the MS memory in accordance with the selected relocation scheme. Before providing additional details of the embodiments of the present technology, it is first useful to describe an exemplary storage device that can be used to implement embodiments of the present technology.

In the following detailed description, reference is made to the accompanying drawings that form a part hereof, and in which is shown by way of illustration specific illustrative embodiments. It is to be understood that other embodiments may be utilized and that mechanical and electrical changes may be made. The following detailed description is, therefore, not to be taken in a limiting sense. In the description that follows, like numerals or reference designators will be used to refer to like parts or elements throughout. In addition, the first digit of a three digit reference number, and the first two digits of a four digit reference number, identifies the drawing in which the reference number first appears.

FIG. 1 is a block diagram depicting one embodiment of a storage device 120 connected to a host device 102 (or embedded in the host device 102), wherein the host device 102 can implement embodiments of the present technology described below. Referring to FIG. 1, the host device 102 stores data into, and retrieves data from, the storage device 120 by issuing write and read commands. The storage device 120 may be embedded in the host device 102 or may exist in the form of a card, universal serial bus (USB) drive, or other removable drive, such as a solid state disk (SSD) that is removably connected to the host device 102 through a mechanical and electrical connector. The host device 102 may be any of a number of fixed or portable data generating devices, such as a personal computer, a smartphone, a personal digital assistant (PDA), a server, a set top box, or the like. More generally, the host device 102 can include host logic that performs the functions of a smartphone, PDA, laptop, server, set top box, etc. While not specifically shown, the host can include and/or be in communication with read only memory (ROM).

The host device 102, which can be referred to more succinctly as the host 102, may include one or more processors 104 that runs one or more application programs 106. The application programs 106, when data is to be stored in or retrieved from the storage device 120, communicate through one or more operating system application programming interfaces (APIs) 108 with a file system 110. The file system 110 may be a software module executed on the processor(s) 104 and manages the files in the storage device 120. The file system 110 manages clusters of data in logical address space. Common operations executed by a file system 110 include operations to create, open, write (store) data, read (retrieve) data, seek a specific location in a file, move, copy, and delete files. The file system 110 may be circuitry, software, or a combination of circuitry and software.

The file system 110 may be a stand-alone chip or software executable by the processor(s) 104 of the host 102. A storage device driver 112 on the host 102 can translate instructions from the file system 110 for transmission over a communication channel 114 between the host 102 and the storage device 120. The interface for communicating over the communication channel 114 may be any of a number of known interfaces, such as SD, MMC, USB storage device, SATA, SCSI, and PCI Express interfaces. A file system data structure, such as a file allocation table (FAT), may be stored in memory (e.g., 124 or 206) of the storage device 120. The host 102 may utilize the file system data structure to maintain a logical address range for all logical block addresses (LBAs) that have been assigned by the host 102 to data. In addition to being used to refer to the communication channel between the host 102 and the storage device 120, the reference number 114 can also be used to refer to host interface signals that are communicated over the communication channel 114. In addition, reference number 114 can refer to modifications in host memory that are read and retrieved from storage device 120 in accordance with a protocol such as NVMe or AHCI operating above the PCI Express transport. The host device 102, which can also be referred to more succinctly as the host 102, uses the file system 110 to address files stored within the storage device 120, which can involve writing data to and reading data from the non-volatile memory 124 of the storage device 120. Exemplary types of file systems that can be used by the host 102 include, but are not limited to, FAT32, exFAT, ext2/3/4, HFS+, and NTFS.

The storage device 120 includes a controller 122 (which can also be referred to as the memory controller 122) in communication with the non-volatile memory 124 via signals 123. The reference number 123 can also be used to refer to a communication channel between the controller 122 and the non-volatile memory 124. Note that FIG. 1 shows a logical depiction of the non-volatile memory 124. In one embodiment, the non-volatile memory 124 can be implemented using one or multiple memory die.

The non-volatile memory 124 can store management tables 125 and one or more activity logs 126. As will be described in additional detail below, in accordance with certain embodiments of the present technology, the non-volatile memory 124 can store a plurality of potential host activity patterns 128, and for each of the potential host activity patterns an associate relocation scheme. The plurality of potential host activity patterns and associated relocation schemes can alternatively be stored in read only memory (e.g., ROM 318 in FIG. 3) of the storage device 120.

In one embodiment, the management tables 125 include one or more L2P (logical to physical mapping) tables and one or more P2L (physical to logical mapping) tables. The controller 122 can use the management tables 125 to map logical block addresses (LBAs) to physical block addresses (PBAs). Such tables 125 can be used to directly map LBAs to the PBAs, or LBAs can be mapped to intermediate or virtual block addresses, which are mapped to PBAs. Other variations are also possible. In some embodiments, the host data 130 is stored in blocks (e.g., Block 0, Block 1, Block 2, . . . ). In some example embodiments, a block of non-volatile memory cells is the unit of erase. In some embodiments, a block represents a plurality of memory cells grouped by common bit lines and word lines. Instructions or commands, such as write commands, that are sent from the host 102 to the storage device 120 over the communication channel 114 may include logical block addresses (LBAs). By contrast, instructions or commands that are sent over the communication channel 123 may include physical block addresses (PBAs).

The one or more activity log(s) 126 keep track of write operations that are performed for the host 102, in response to receiving write commands from the host 102. Additionally, the activity log(s) 126 keep track of read operations that are performed for the host 102, in response to receiving read commands from the host 102. Entries in the activity log(s) 126 can be specified in terms of logical block addresses (LBAs) and/or LBA ranges, and preferably including timing information (e.g., a time stamp) that specifies when write and read operations are performed. As will be described in additional detail below, in accordance with certain embodiments of the present technology, a host activity pattern can be predicted based on the activity log(s) 126. The predicted host activity pattern can include a predicted write pattern. Additionally, or alternatively, the predicted host activity pattern can include a predicted read pattern.

Still referring to FIG. 1, the non-volatile memory 124 includes a portion of which is designated as intermediate storage (IS) memory and another portion of which is designated as main storage (MS) memory. As depicted in FIG. 1, host data 130 can be stored in the IS memory and in the MS memory. More specifically, when the storage device 120 receives a write command from the host 102, the storage device 120 in response thereto can either store host data in the portion of the non-volatile memory 124 that is designed as the IS memory 132, or in the portion of the non-volatile memory 124 that is designated as the MS memory 134. There are various known techniques that can be used by the memory controller 122 to determine whether to store data in the IS memory 132 or in the MS memory 134. Additionally, there are various known techniques that can be used by the memory controller 122 to relocate (i.e., transfer) data from the IS memory 132 to the MS memory 134. Embodiments of the present technology, which are described in additional detail below, are unrelated to any specific technique used by the memory controller 122 to determine whether to initially store data in the IS memory 132 or in the MS memory 134. Rather, embodiments of the present technology, which are described in additional detail below, generally relate to improved techniques for relocating (i.e., transferring) data from the IS memory 132 to the MS memory 134.

As shown in FIG. 1, host data 130 is stored in both the IS memory 132 and the MS memory 134. Individual blocks (e.g., Block 0, Block 1, Block 2, . . . ) of the host data 130 may be divided for operational purposes into pages of memory cells. The memory cells of each of the blocks, for example, can each be divided into eight pages P0-P7. Alternatively, there may be 16, 32 or more pages of memory cells within each block. The page is the unit of data programming and reading within a block, containing the minimum amount of data that are programmed or read at one time. However, in order to increase the memory system operational parallelism, such pages within two or more blocks may be logically linked into metapages. A metapage, can for example, be formed of one physical page from each of the four blocks (e.g., a metapage can for example includes the page P2 in each of the four blocks but the pages of a metapage need not necessarily have the same relative position within each of the blocks). A metapage may be the maximum unit of programming.

Still referring to FIG. 1, the IS memory 132 has lower write and read latencies than the MS memory 134. In other words, the IS memory 132 can be written to and read from more at greater speeds than the MS memory 134 can be written to and read from. Additionally, the IS memory 132 has greater endurance than the MS memory 134. For example, an expected lifetime of each of the cells of the IS memory 132 may be 20,000 program/erase (P/E) cycles, while the expected lifetime of each of the cells of the MS memory 134 may be 2,000 P/E cycles, in which case the cells of the IS memory 132 would have 10× the endurance of the cells of the MS memory 134. This is just one example, which is not meant to be all encompassing. The IS memory 132 also has a lower storage density and capacity than the MS 134. More specifically, individual cells of the IS memory 132 may store less bits of host data than individual cells of the MS memory 134, and a significantly smaller portion of the non-volatile memory 124 that is used to store host data 130 can be allocated to the IS memory 132 than is allocated to the MS memory 134. More generally, the more expensive IS memory 132, which will likely take up less than ten percent of a total storage budget of the storage device 120, and may take up as little as two percent or less than the total storage budget, depending upon the storage device 120. The exact ratio of the IS memory 132 to the MS memory 134 depends on the specific product, and generally affects the cost versus performance and endurance of the storage device 120.

In accordance with certain embodiments, the IS memory 132 can include single-level cell (SLC) memory wherein a single bit of data is stored per memory cell, which can also be referred to as a storage element or region. More specifically, SLC memory may be operated to store two detectable levels of charge in order to store one bit, which can have one of two possible states: 0 or 1. The IS memory 132 can alternatively, or additionally, include forms of persistent byte-addressable memory including ReRAM, Phase-Change Memory, or Magnetic RAM. By contrast, the less expensive MS memory 134, can include multi-level cell (MLC) memory wherein two or more bits are stored per memory cell. MLC memory, as the term is being used herein, can include memory cells wherein two, three or four bits of data, or potentially even more than four bits of data, are being stored per memory cell. Accordingly, as the term is being used herein, the term MLC memory also encompasses triple-level cell (TLC) memory and quad-level cell (QLC) memory. For example, MLC memory may be operated to store four detectable levels of charge that can be used to store four states and can retain two bits of data: 00, 01, 10 or 11. For another example, where the MLC memory is TLC memory, it may be operated to store eight detectable levels of charge that can be used to store eight states and can retain three bits of data: 000, 001, 010, 011, 100, 101, 110 or 111. For still another example, where the MLC memory is QLC memory, it may be operated to store sixteen detectable levels of charge that can be used to store sixteen states and can retain four bits of data: 0000, 0001, 0010, 0011, 0100, 0101, 0110, 0111, 1000, 1001, 1010, 1011, 1100, 1101, 1110, or 1111. The IS memory 132 can be referred to herein more succinctly as the IS 132. Similarly, the MS memory 134 can be referred to herein more succinctly as the MS 134.

As noted above, in the Background, the IS memory 132 may be used to provide for faster write throughput, and may also be used as a safe-zone to quickly store host data prior to storing the host data in the MS memory 134. The IS memory 132 may also function as a non-volatile memory cache that enables hot data stored within the IS memory 132 to be accessed very quickly. The general concept is to use more expensive non-volatile memory that has lower write and read latencies, greater endurance, and lower storage density and capacity as the IS memory 132, and use less expensive non-volatile memory that has higher write and read latencies, lower endurance, and higher storage density and capacity as the MS memory 134.

As noted above, in the Background, the process of transferring data from the IS memory 132 to the MS memory 134 is called "relocation." Relocation is performed in order to clear space within the IS memory 132, so that there is space available within the IS memory 132 to store incoming host data. In accordance with certain embodiments, relocation is performed as a background process without any intervention from the host 102. Preferably, relocation is performed when the storage device 120 is idle, or more specifically, not responding to write or read commands received from the host 102. In certain situations, the storage device 120 may run out of IS memory 132 while it is still needed, which could reduce write throughput, and is generally undesired. However, read latency from the IS memory 132 is also shorter than from the MS memory 134, hence it makes sense to avoid relocating data that would be used shortly after writing, as its read latency would be lower if it is kept in the IS memory 132.

While the IS memory 132 is generally superior in both performance and endurance, it is too small to effectively cache all host data. Conventional techniques for performing relocation are typically based on simple heuristics, such as first-in first-out (FIFO), or based on an aging algorithm. However, conventional techniques for performing relocation, which can also be referred to as conventional relocation schemes, are not optimal for many use cases, as there is a clear distinction between what would be an optimal relocation scheme for use in a storage device that is being used for streaming videos, and what would be an optimal relocation scheme for use in a storage device that is being used for repeatedly updating a same relatively small chunk of data. The streaming videos example is an extreme use case, where an entire flash drive is written and then rewritten immediately, time after time. The repeatedly updating of a same relatively small chunk of data, is another extreme use case on the other end of the spectrum, where a same LBA may be written over and over again. There is a large gray area between the above noted extreme case scenarios. Embodiments of the present technology, which will be explained in more detail below, can be used to manage relocation in manners that provides for improved write and read performance compared to when conventional relocation is performed. However, before providing further details of such embodiments of the present technology, additional exemplary details of the storage device 120 that can be used to implement embodiments of the present technology will be described with reference to FIGS. 2,3 and 4.

Figure 2:
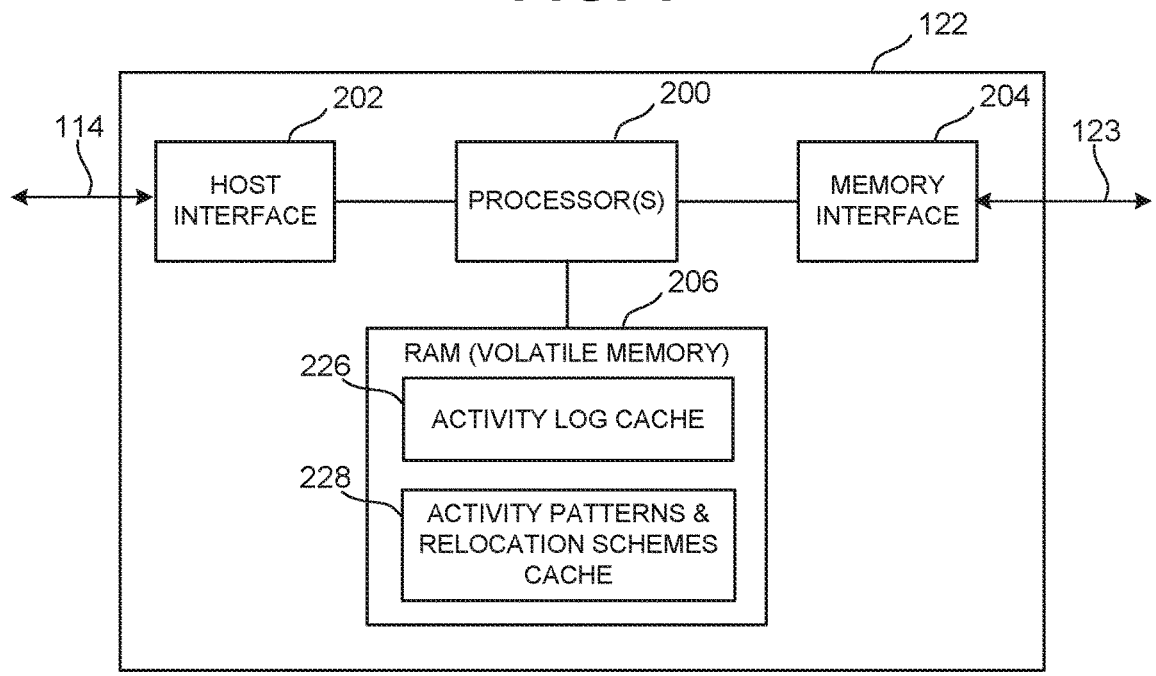
FIG. 2 is a block diagram of one example embodiment of the hardware architecture for a controller of the storage device, introduced in FIG. 1, that can implement certain embodiments of the present technology described herein.

FIG. 2 is a block diagram of one example embodiment of the hardware architecture for the controller 122 that can be used to implement the technology described herein. The controller 122 includes one or more processors 200 in communication with a host interface 202 and a memory interface 204. The host interface 202 communicates with the host device 102 via host interface signals 114. In one embodiment, the host interface 202 is a Multi Media Card (MMC) interface. In another embodiment, the host interface 202 is a Universal Flash Storage (UFS) interface. The memory interface 204 communicates with the non-volatile memory 124 via signals 123 and can be any suitable interface including Toggle Mode 200, 400 or 800. The processor(s) 200 are also in communication with random access memory (RAM) 206, which is a local volatile memory for the controller 122, and thus, can also be referred to as controller RAM 206. The RAM 206 can be any type of volatile storage (e.g., DRAM, SRAM, etc.). In one embodiment, the RAM 206 stores code (software and/or firmware) that programs the processor(s) 200 to perform the functions described below for managing the storage device 120, including selecting and executing a relocation scheme. In another embodiment, one or more processor(s) 200 include custom hardware (FPGAs, ASICS, etc.), with or without software, to perform the functions described below for managing the storage device 120, including, including selecting and executing a relocation scheme.

The storage device 120 may include functions for memory management. In operation, the processor(s) 200 may execute memory management instructions (which may be resident in instructions) for operation of the memory management functions. The memory management functions may control the assignment of the one or more portions of the memory within storage device 120, such as the controller RAM 206. For example, memory management functions may allocate a portion of the controller RAM 206 for a data cache. Memory management functions may also specify which portion of the non-volatile memory 124 is IS memory 132 and which portion is MS memory 134. One, some, or all of the memory management functions may be performed by one or separate elements within the storage device 120. A portion of the controller RAM 206 may be used to cache copies of the management tables 125, or portions thereof, to enable the controller 122 to perform logical to physical (LTP) and physical to logical (PTL) address translations much faster than if the controller 122 needed to always access the management tables 125 stored in the non-volatile memory. For example, the controller RAM 206 can include an LTP cache that can store one or more tables (or portions thereof) that are used for LTP translations, and a PTL cache that can store one or more tables (or portions thereof) that are used for PTL translations. The controller RAM 206 can also be used to cache other information stored in the non-volatile memory 124, in order to provide for fast access to such information by the controller 122, and more specifically, by the processor(s) 200 thereof. For example, the controller RAM 206 can include an activity log cache 226 that can store a copy of the activity log(s) 126 (or portions thereof), and an activity patterns and relocation schemes cache 228 that can store the potential host activity patterns and associated relocation schemes 128 (or portions thereof) that are used for performing relocation from the IS memory 132 to the MS memory 134.

Figure 3:
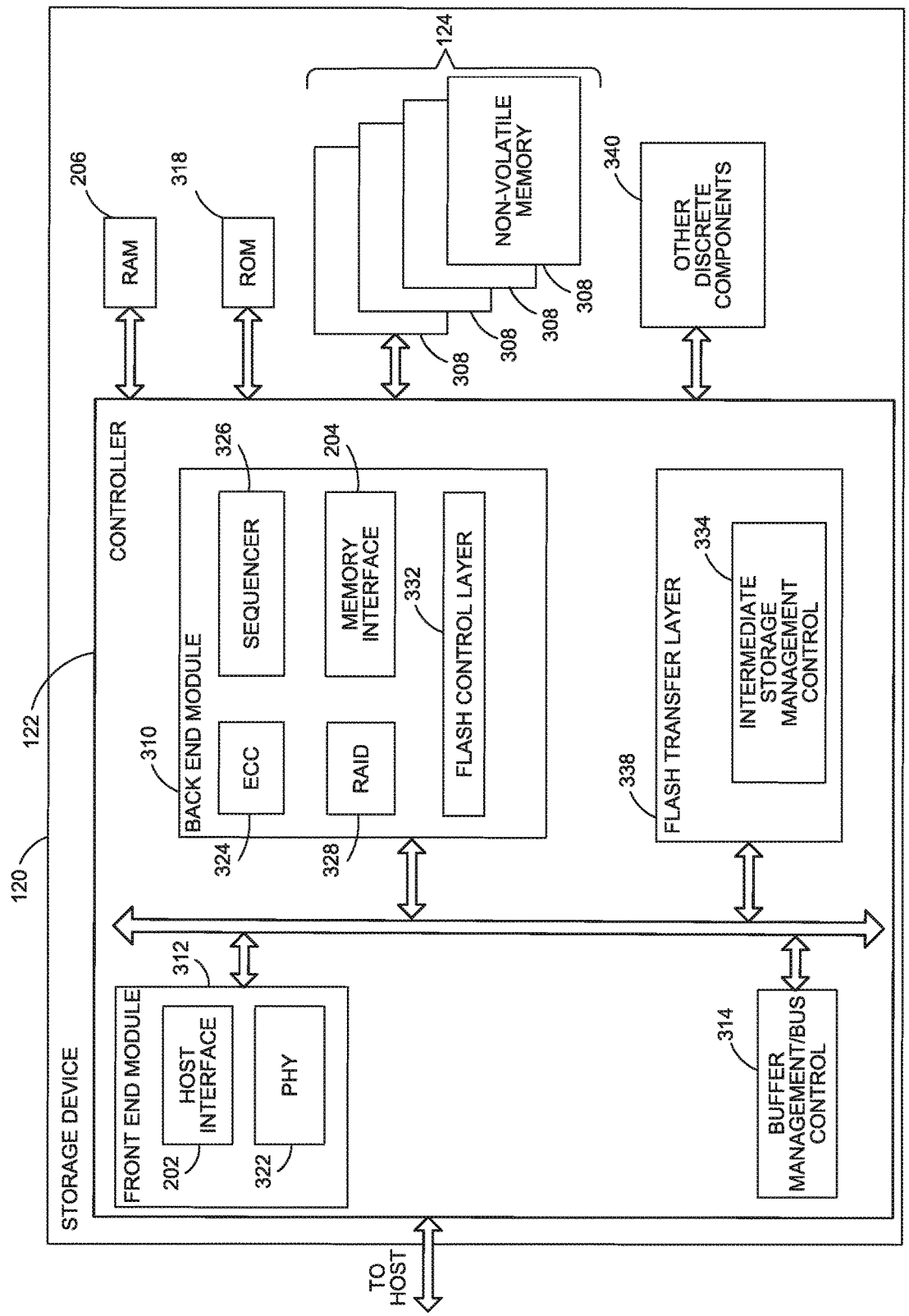
FIG. 3 is a block diagram of one example of a storage device.

FIG. 3 is a block diagram of one exemplary embodiment of the storage device 120. However, the architecture depicted in FIG. 3 can also be used to implement other types of non-volatile storage devices. FIG. 3 shows that the storage device 120 includes the controller 122 connected to one or more non-volatile memory die 308 (which comprise the non-volatile memory 124 depicted in FIG. 1). FIG. 3 provides details of some of the software components of the controller 122, which will be discussed in more detail below. Depending on the technology used to implement the IS memory 132, the IS memory can be in different non-volatile memory die 308 than the MS memory 134, or a same non-volatile memory die 308 can include some of the IS memory 132 and some of the MS memory 134.

As used herein, for a system that uses non-volatile memory, the controller 122 is a device that manages data stored in the non-volatile memory and communicates with a host. The controller 122 can have various functionality in addition to the specific functionality described herein. For example, the controller 122 can format the non-volatile memory to ensure the memory is operating properly, map out bad memory cells (the physical unit of storage), and allocate spare memory cells to be substituted for future failed cells. Some part of the spare memory cells can be used to hold firmware to operate the controller and implement other features. That firmware can also be read into local volatile memory during operation. When a host needs to read data from or write data to the non-volatile memory, it will communicate with the controller 122. If the host provides a logical address to which data is to be read/written, the controller 122 converts the logical address received from the host to a physical address in the physical flash memory. The controller 122 can also perform various memory management functions, such as, but not limited to, wear leveling (distributing write operations among memory die or blocks of the memory to avoid wearing out specific blocks of memory that would otherwise be repeatedly written to) and garbage collection (after a block is full, moving only the valid pages of data to a new block, so the full block can be erased and reused).

The interface between the controller 122 and the non-volatile memory die 308 may be any suitable flash interface, such as Toggle Mode 200, 400, or 800, or any other communications interface such as PCI Express. In some embodiments, the storage device 120 includes a single channel between the controller 122 and the non-volatile memory die 308; however, the subject matter described herein is not limited to having a single memory channel. For example, in some memory system architectures two, four, eight or more channels may exist between the controller 122 and the memory die 308, depending on controller capabilities. In any of the embodiments described herein, more than a single channel may exist between the controller 122 and the memory die 308, even if a single channel is shown in the drawings.

As depicted in FIG. 3, the controller 122 includes a front end module 312 that interfaces with a host, a back end module 310 that interfaces with the one or more non-volatile memory die 308, and various other modules that perform functions which will now be described.

The components of the controller 122 depicted in FIG. 3 may take the form of a packaged functional hardware unit (e.g., an electrical circuit) designed for use with other components, program code (e.g., software or firmware) executable by one or more processors or processing circuitry that usually performs a particular function of related functions, or a self-contained hardware or software component that interfaces with a larger system. For example, each module may include an application specific integrated circuit (ASIC), a Field Programmable Gate Array (FPGA), an electrical circuit, a digital logic circuit, an analog circuit, a combination of discrete circuits, gates, or any other type of hardware or combination thereof. Alternatively or in addition, each module may include software stored in a processor readable device (e.g., local volatile memory) to program a processor to perform the functions described herein.

The storage device 120 includes random access memory (RAM) 206 (same local volatile memory as discussed above with respect to FIG. 2) and read only memory (ROM) 318. Referring again to the modules of the controller 122, a buffer manager/bus control 314 manages the RAM 206 and controls the internal bus arbitration of the controller 122. The ROM 318 stores boot code for the controller. Although illustrated in FIG. 3 as located separately from the controller 122 (but connected to controller 122), in other embodiments one or both of the RAM 216 and the ROM 318 may be located within the controller. In yet other embodiments, portions of the RAM and the ROM may be located both within the controller and outside the controller. Further, in some implementations, the controller 122, the RAM 206, and the ROM 318 may be located on separate semiconductor die. In certain embodiments, instead of storing the potential host activity patterns and associate relocation schemes in the non-volatile memory 124, the potential host activity patterns and associate relocation schemes can be stored in the ROM 318.

The front end module 312 includes the host interface 202 (introduced in the discussion of FIG. 2) and a physical layer interface (PHY) 322 that provide the electrical interface with the host or next level storage controller. The choice of the type of host interface 202 can depend on the type of memory being used. Exemplary types of the host interfaces 202 include, but are not limited to, SATA, SATA Express, SAS, Fibre Channel, USB, PCIe, MMC, UFS and NVMe. The host interface 202 typically facilitates transfer for data, control signals, and timing signals. In one embodiment, the front end module 312 provides the single communication interface adapted to communicate with an external computing device (e.g., host) for the controller 122 and the memory die 308 of the storage device 120.

The back end module 310 includes an error correction code (ECC) engine 324 that encodes the data bytes received from the host, and decodes and error corrects the data bytes read from non-volatile memory die 308. The ECC engine 324 may include circuitry to receive data and generate one or more codewords representing an encoding of the data. For example, the ECC engine 324 may be configured to utilize a Reed-Solomon encoding, a BCH code, a low density parity check (LDPC) code, one or more other error detection and correction codes, or any combination thereof. A command sequencer 326 generates command sequences, such as program and erase command sequences, to be transmitted to the non-volatile memory die 308. A RAID (Redundant Array of Independent Dies) module 328 manages generation of RAID parity and recovery of failed data. The RAID parity may be used as an additional level of integrity protection for the data being written into the non-volatile memory 124. In some cases, the RAID module 328 may be a part of the ECC engine 324. Note that the RAID parity may be added as an extra die or dies, but it may also be added within the existing die, e.g. as an extra plane, or extra block, or extra WLs within a block. The memory interface 204 (introduced in the discussion of FIG. 2) provides the command sequences to the non-volatile memory die 308 and receives status information from the non-volatile memory die 308. In one embodiment, the memory interface 204 may be a double data rate (DDR) interface, such as a Toggle Mode 200, 400, or 800 interface. A flash control layer 332 controls the overall operation of back end module 310.

During the process of writing data into memory, such as into the IS memory 132, the data may be encoded with extra bits ("parity bits") to form a codeword. In the presence of noise, some of the bits representing the codeword may change, corrupting the original codeword with errors. When the codeword is read from the memory, a decoder may be used to identify and correct the errors using error correction coding (ECC). For example, Bose-Chaudhuri-Hocquenghem (BCH) ECC schemes are used in applications where bit errors tend to be uncorrelated. Relocation of data from the IS memory 132 to the MS memory 134 may be done with or without ECC control. When data is written to the IS memory 132, an error may be introduced to a codeword. If the codeword including an error is relocated from the IS memory 132 to the MS memory 134, without first decoding it and correcting the error, as may be done during an on-chip copy (OCC) operation, the error may turn into a hard error (where MLC type flash memory is programmed using the wrong voltage), which may impair throughput and endurance. In order to reduce the probability and extend of hard errors in the MS memory 134, data that is being relocated from the IS memory 132 can be decoded and error corrected before being re-encoded with parity bits and relocated (i.e., transferred) to the MS memory 134. For example, the memory controller 122 can perform such decoding, error correction, and re-encoding of data, which process can be referred to as copy through controller (CTC). While the use of CTC should reduce hard errors, it will increase relocation latency.

Additional components of the storage device 120 illustrated in FIG. 3 include a Flash Translation Layer (FTL) or Media Management Layer (MML) 338, which performs wear leveling of memory cells of the non-volatile memory die 308. The storage device 120 also includes other discrete components 340, such as external electrical interfaces (e.g., as part of the host interface and the memory interface), external RAM, resistors, capacitors, or other components that may interface with the controller 122. In alternative embodiments, one or more of the physical layer interface 322, the RAID module 328, the media management layer 338 and the buffer management/bus controller 314 are optional components that are not necessary in the controller 122.

The Flash Translation Layer (FTL) or Media Management Layer (MML) 338 may be integrated as part of the flash management that may handle errors and interfacing with the host. In particular, the FTL 338 is responsible for the internals of non-volatile memory management. In particular, the FTL 338 may include an algorithm in the memory device firmware which translates writes from the host into writes to the memory of a memory die 308. The FTL 338 may be needed because: 1) the memory may have limited endurance; 2) the memory may only be written in multiples of pages; and/or 3) the memory may not be written unless it is erased as a block. FTL 338 understands these potential limitations of the memory which may not be visible to the host. Accordingly, the FTL 338 attempts to translate the writes from host into writes into the non-volatile memory 124, which can be flash memory. The FTL 338 also manages the process for mapping between logical addresses from the host and physical addresses on the memory die 308. This can includes updating the L2P tables and the P2L tables during programming, erasing and performing move commands.

The FTL 338 is shown as including an intermediate storage (IS) management controller 334, which can also be referred to as the IS manager 334. The IS manager 334 can select from among a plurality of possible relocations schemes stored in the non-volatile memory 124 (e.g., in the activity patterns and relocation schemes 128), stored in the ROM 318, and/or stored in the controller RAM 206 (e.g., in the activity patterns and relocation schemes cache 228). As will be described in additional detail below, the IS manager 334 can select a relocation scheme based on a predicted host activity pattern, and can execute (or cause the execution of) the selected relocation scheme. The IS manager 334 can predict an activity pattern based on the activity log(s) 126 stored in the non-volatile memory 124 and/or the activity log cache 226 stored in the controller RAM 206. As will be described in additional detail below, in accordance with certain embodiments of the present technology, the IS manager 334 can determine when the relocation scheme should be changed. Additionally, in accordance with certain embodiments of the present technology, the IS manager 334 can identify new or further potential host activity patterns and generate associated relocation schemes to add to the stored potential host activity patterns and relocation schemes 128, after which time the new relocation schemes would be available for selection and execution by the IS manager 334. Alternatively, the IS management controller 334, or a portion thereof, may be included within the back end module 310. For example, the back end module 310 may execute relations schemes using the logic of the FTL 338. It is also possible that a portion of the IS management controller 334 be implemented by the front end module 312, and more specifically, by the host interface 202 (of the front end module 312) that records the one or more activity log(s) 126. More generally, in accordance with certain embodiments, the IS manager 334 is implemented by the memory controller 122.

In accordance with certain embodiments, relocation is performed using dedicated hardware circuitry, e.g., which can be one of the other discrete components 340 represented in FIG. 3. A benefit of such embodiments is that relocation can be performed without needing to stall the memory controller's 122 work process for the purpose of performing relocation. This would allow both reasonable relocation latency, and lower error counts in the MS memory 134. This way, relatively high rate ECC (low parity) can be used for storing the data in the IS memory 132, and then later the data can be decoded and re-encoded with lower code rate (more parity) for longer term storage in the MS memory 134.

Figure 4:
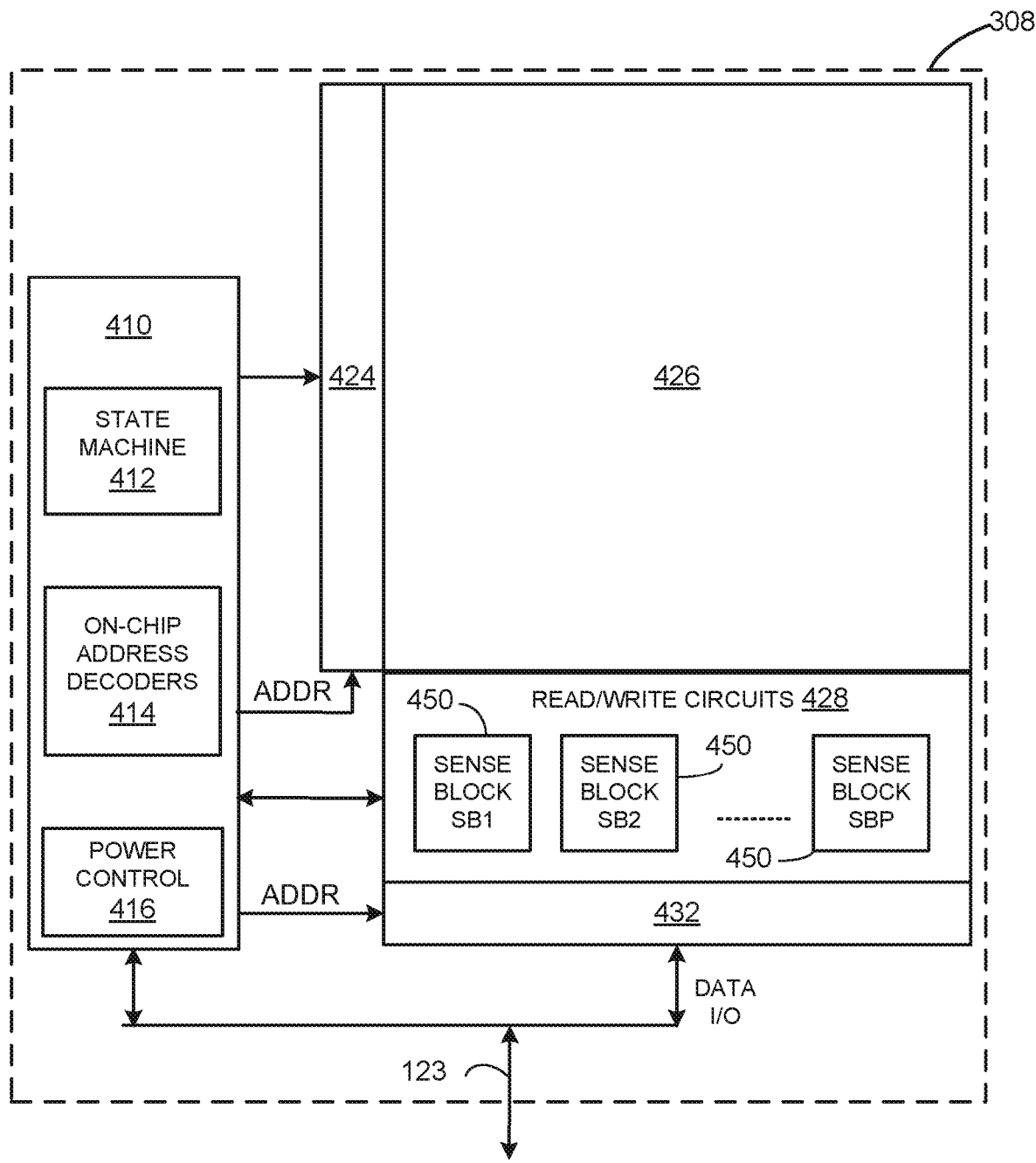
FIG. 4 is a block diagram of one example of a non-volatile memory die.

FIG. 4 is a functional block diagram of an example memory die 308. The components depicted in FIG. 4 are electrical circuits. In one embodiment, the memory die 308 includes a monolithic three dimensional memory structure 426 of non-volatile memory cells, control circuitry 410, and read/write circuits 428. In other embodiments, a two dimensional array of memory cells can be used. The memory structure 426 is addressable by word lines via a row decoder 424 and by bit lines via a column decoder 432. The read/write circuits 428 include multiple sense blocks 450 including SB1, SB2, . . . , SBp (sensing circuitry) and allow a page of memory cells to be read or programmed in parallel. Commands and data are transferred between the controller 122 and the memory die 308 via signal lines 123. In one embodiment, the memory die 308 includes a set of input and/or output (I/O) pins that connect to the signal lines 123.

One embodiment of the memory structure 426 comprises a monolithic three dimensional memory structure in which multiple memory levels are formed above (and not in) a single substrate, such as a wafer, with no intervening substrates. The memory structure 426 may comprise any type of non-volatile memory that is monolithically formed in one or more physical levels of arrays of memory cells having an active area disposed above a silicon substrate. In one embodiment, the memory structure 426 implements three dimensional NAND flash memory. One example of three dimensional NAND flash memory can be found in U.S. Pat. No. 9,548,130, incorporated herein by reference in its entirety. Other embodiments include two dimensional NAND flash memory, two dimensional NOR flash memory, ReRAM cross-point memory, magnetoresistive memory (e.g., MRAM), phase change memory (e.g., PCRAM), and others.

The control circuitry 410 cooperates with the read/write circuits 428 to perform memory operations (e.g., erase, program, read, and others) on the memory structure 426, and includes a state machine 412, an on-chip address decoder 414, and a power control module 416. The state machine 412 provides die-level control of memory operations. In one embodiment, the state machine 412 is programmable by software. In other embodiments, the state machine 412 does not use software and is completely implemented in hardware (e.g., electrical circuits). In one embodiment, the control circuitry 410 includes registers, ROM fuses and other storage devices for storing default values such as base voltages and other parameters. The on-chip address decoder 414 provides an address interface between addresses used by the host 102 or the controller 122 to the hardware address used by the decoders 424 and 432. The power control module 416 controls the power and voltages supplied to the word lines and bit lines during memory operations. It can include drivers for word lines, selection transistors, source lines, and other components. The power control module 416 may include charge pumps for creating voltages. The sense blocks 450 include bit line drivers.

Any one or any combination of the control circuitry 410, the state machine 412, the decoders 414/424/432, the power control module 416, the sense blocks 450, the read/write circuits 428, and the controller 122 can be considered one or more control circuits that performs the functions described herein.

Multiple memory elements in the memory structure 426 may be configured so that they are connected in series or so that each element is individually accessible. By way of non-limiting example, flash memory devices in a NAND configuration (NAND flash memory) typically contain memory elements connected in series. A NAND string is an example of a set of series-connected memory cells and select gate transistors that can be used within the memory structure 426. A NAND flash memory array may be configured so that the array is composed of multiple NAND strings of which a NAND string is composed of multiple memory cells sharing a single bit line and accessed as a group. Alternatively, memory elements may be configured so that each element is individually accessible, e.g., a NOR memory array. NAND and NOR memory configurations are exemplary, and memory cells may be otherwise configured.

The memory cells may be arranged in the single memory device level in an ordered array, such as in a plurality of rows and/or columns. However, the memory elements may be arrayed in non-regular or non-orthogonal configurations, or in structures not considered arrays.

In one embodiment, a three dimensional memory array is arranged so that memory cells occupy multiple planes or multiple memory device levels, thereby forming a structure in three dimensions (i.e., in the x, y and z directions, where the z direction is substantially perpendicular and the x and y directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory cells. The vertical columns may be arranged in a two dimensional configuration, e.g., in an x-y plane, resulting in a three dimensional arrangement of memory cells, with memory cells on multiple vertically stacked memory planes. Other configurations of memory elements in three dimensions can also constitute a three dimensional memory array.

By way of non-limiting example, in a three dimensional NAND memory array, the memory elements may be coupled together to form vertical NAND strings that traverse across multiple horizontal memory device levels. Other three dimensional configurations can be envisioned wherein some NAND strings contain memory elements in a single memory level while other strings contain memory elements which span through multiple memory levels. One example memory system is a three dimensional memory structure that includes vertical NAND strings with charge-trapping material. Three dimensional memory arrays may also be designed in a NOR configuration.

The memory structure 426 can also be ReRAM cross point memory. One example of a ReRAM cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

The memory structure 426 can also be Magnetoresistive memory (MRAM), which stores data by magnetic storage elements. In one example, the elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

The memory structure 426 can also be phase change memory (PCRAM), which exploits the unique behavior of chalcogenide glass. One embodiment uses a GeTe-Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave. The memory structure 426 includes many blocks of memory cells. A person of ordinary skill in the art will recognize that the technology described herein is not limited to a single specific memory structure, but covers many relevant memory structures within the spirit and scope of the technology as described herein and as As noted above, certain embodiments of the present technology relate to improved techniques for relocating (i.e., transferring) data from IS memory (e.g., 132) to MS memory (e.g., 134) of non-volatile memory (e.g., 124) of a storage device (e.g., 120). The high level flow diagram of FIG. 5 will be used to describe certain such techniques. More specifically, the high level flow diagram of FIG. 5 will be used to summarize methods for performing adaptive management of IS memory. Such methods can be for use by a storage device (e.g., 120) that receives read and write commands from a host (e.g., 102) and that includes non-volatile memory (e.g., 124) and a memory controller (e.g., 122) in communication with the non-volatile memory (124) and the host (102), wherein the non-volatile memory (e.g., 124) includes a portion of its memory designated as IS memory (e.g., 132) and another portion designated as MS memory (e.g., 134), wherein the IS memory has lower write and read latencies, greater endurance, and lower storage density and capacity than the MS memory.

Figure 5:
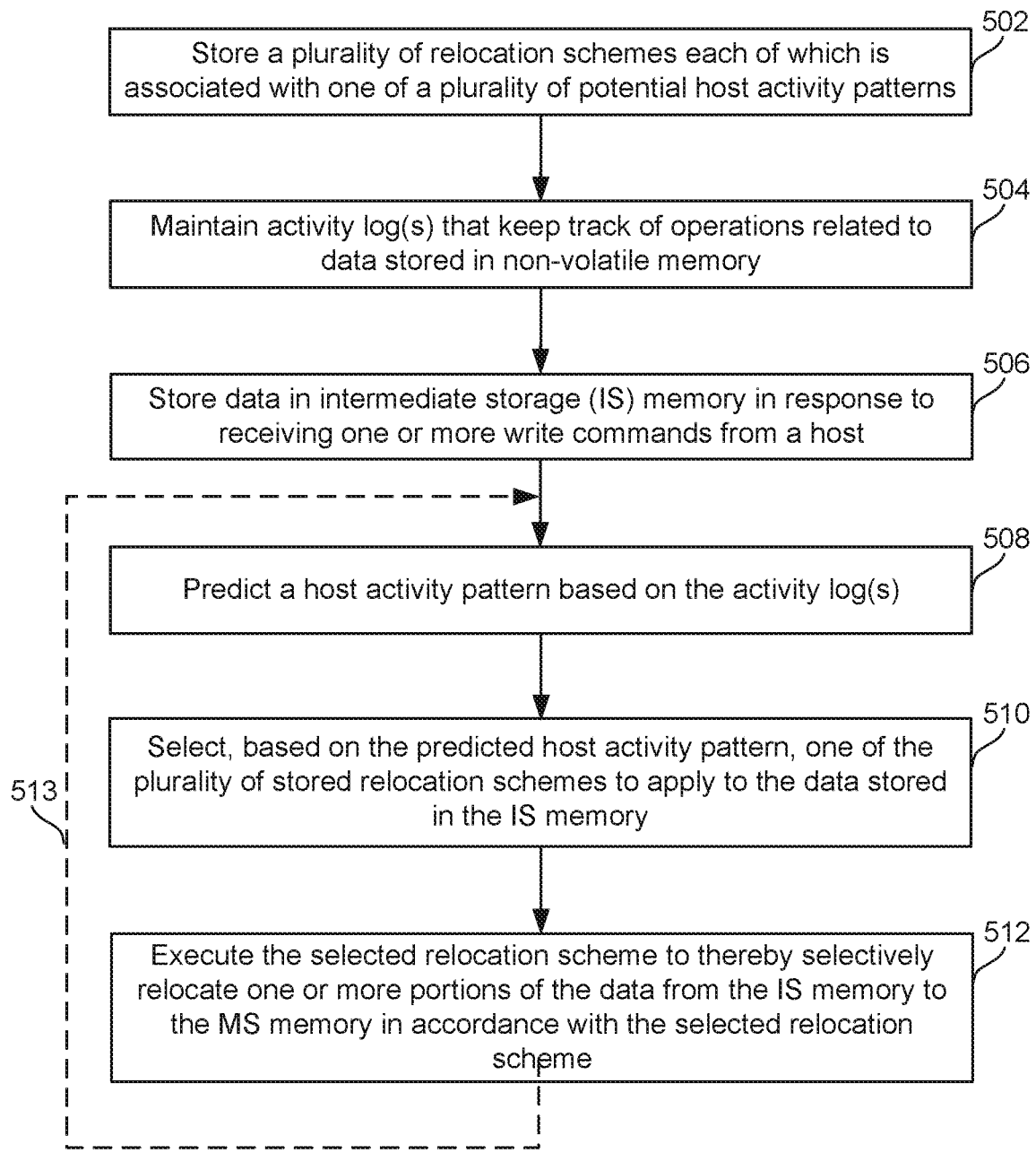
FIG. 5 is a high level flow diagram that is used to summarize methods for performing adaptive management of IS memory, in accordance with certain embodiments of the present technology.

Referring to FIG. 5, step 502 involves storing a plurality of relocation schemes each of which is associated with one of a plurality of potential host activity patterns. The potential host activity patterns, which can include potential write and read patterns, can be determined by analyzing activity logs from numerous different storage devices that were used to store data for hosts operated on by numerous different types of users. For example, where the host is a single-processor low performance notebook computer and the user is a student that primarily streams movies and searches the Internet, the potential host activity patterns will look very different than where the host is a high performance multi-processor computer that is used to perform simulations and/or computer modeling and the user is an engineer. The potential host activity patterns can include some number (e.g., 100, 500 or 1000, but not limited thereto) of the most common expected activity patterns that were identified by analyzing numerous different activity logs. Associated with each of the potential host activity patterns is a relocation scheme, which is preferably optimized for particular host activity pattern. There can be a one-to-one correspondence between relocation schemes and potential host activity patterns. In other words, for every potential host activity pattern stored there can be a unique relocation scheme stored. Alternatively, it is possible that more than one of the potential host activity patterns can be associated with a same one of the relocation schemes. For example, there may be 1000 potential host activity patterns that are stored, but only 800 relocation schemes stored, such that certain potential host activity patterns share a same relocation scheme.

In certain embodiments, a preferred relocation scheme can be determined for a potential host activity pattern by optimizing a cost function. An exemplary cost function may attempt to minimize or otherwise take into account costs associated with reading data from IS memory, transferring (i.e., relocating) data from IS memory to MS memory, and reading data from MS memory, but is not limited thereto. Costs may be in terms of latency and/or power consumption. This is just one example of a cost function that can be used to determine relocation schemes for potential host activity patterns, which is not intended to be all encompassing. Different relocation schemes can have different relocation properties, such as, but not limited to, differing timing and length properties Timing properties can specify how often, or more generally the temporal details, of when relocation is to occur. Length properties can specify, for example, the length of chunks of data that are to be relocated from the IS memory to the MS memory.

Referring briefly back to FIG. 1, the plurality of potential host activity patterns and associated relocation schemes 128 are shown as being stored in the non-volatile memory 124, and more specifically, may be stored in the MS memory 134. The plurality of potential host activity patterns and associated relocation schemes can alternatively be stored in the ROM 318 shown in FIG. 3. Additionally, as shown in FIG. 2, in order to provide faster and more power efficient access to the plurality of potential host activity patterns and associated relocation schemes, a copy of the plurality of potential host activity patterns and associated relocation schemes (or portions thereof) can be stored in a cache 228 in the RAM 206 that is included within and/or accessible by the memory controller 122. An initial plurality of potential host activity patterns and associated relocation schemes 128 can be identified and stored in the storage device 120 during a one-time initial configuration of the storage device 120, e.g., after the storage device 120 has been manufactured but has not yet distributed for sale. The potential host activity patterns and associated relocation schemes 128, or portions thereof, can be copied to the cache 228 each time the storage device 120 is powered up or reset. As will be described below, in accordance with certain embodiments or the present technology, additional potential host activity patterns and associate relocation schemes may be added after the storage device 120 has been distributed and is being used to store host data for a user.

Referring again to FIG. 5, step 504 involves maintaining one or more activity logs that keep track of operations related to data stored in the non-volatile memory 124 of the storage device 120. Such activity log(s) can keep track of write operations used to write data to the IS memory 132, write operations used to write data to the MS memory 134, read operations used to read data from the IS memory 132, and read operation used to read data from the MS memory 134, but is not limited thereto. Referring briefly back to FIG. 1, one or more activity logs 126 can be stored in the non-volatile memory 124. Additionally, as shown in FIG. 2, in order to provide faster and more power efficient access to the activity log(s) 126, a copy of the activity log(s) 126 (or portions thereof) can be stored in a cache 226 in the RAM 206 that is included within and/or accessible by the memory controller 122. Entries in the activity log(s) 126 can be specified in terms of logical block addresses (LBAs) and/or LBA ranges, and preferably including timing information (e.g., a time stamp) that specifies when write and read operations are performed. This way the relative timing of the write and read operations, including the temporal gaps between such operations, can be kept track of.

Referring again to FIG. 5, step 506 involves storing data (e.g., host data) in the IS memory (e.g., 132) of the storage device (e.g., 120) in response to receiving one or more write commands from a host (e.g., 102). Any one or more various known or future developed techniques can be used by a memory controller (e.g., 122) to determine when to store data in the IS memory 132. For example, for certain storage devices 120, data may always be stored in the IS memory 132 of the storage device before being relocated at a later time, in accordance with a relocation scheme, to the MS memory 134. For other storage device 120, the memory controller 122 thereof may determine that in certain instances data should be written directly to the MS memory 134 without first being stored in the IS memory 132. Other variations are also possible and within the scope of the embodiments described herein. In accordance with an embodiment, whenever data is stored to the IS memory 132, the activity log is updated, or more specifically, one or more corresponding entry is added to the activity log. Accordingly, even though step 504 is shown before step 506 in FIG. 5, aspects of step 504 may occur simultaneously with or shortly after aspects of step 506. The activity log can more generally be updated whenever write and read operations occur.

Still referring to FIG. 5, step 508 involves predicting a host activity pattern based on the activity log(s). A predicted host activity pattern may be specified in terms of LBAs and/or LBA ranges, and may also be specified in terms of temporal information. A predicted host activity pattern can be a predicted write pattern. Additionally, or alternatively, a predicted host activity pattern can be a predicted read pattern. More generally, a predicted host activity pattern can be a predicted patterns of write and/or read operations that are performed for the host 102 that writes data to and reads data from the storage device 120. Step 508 can be performed by the memory controller 122, or more specifically, by the IS manager 334 thereof. It would also be possible for step 508 to be performed by a circuit or some other discrete component (e.g., 340) that is dedicated to predicting host activity patterns, and potentially also dedicated to selecting and/or executing relocation schemes. The activity log(s) 126 can be stored in the non-volatile memory 126, and the activity log(s) or portions thereof can be cashed in the activity log cache 226 of the RAM, as was described above.

Step 508 can be performed by recognizing a repeated pattern from the activity log, and predicting that the pattern will continue to be repeated. For a first example, an activity log may specify that data is written to a specific range of LBAs, then read thirty times before being deleted, and then this activity is repeated 100 times. Example contents of such an activity log is shown in FIG. 9. Based on the activity log, it can be predicted at step 508 that this same activity pattern will continue to be repeated. In other words, a first example of a predicted host activity pattern may be repeated writing of data to a specific range of LBAs, then reading data from the specific range of LBAs thirty times, and then deleting the data from the specific range of LBAs.

For a second example, an activity log may specify that: data is written to LBA 0 to LBA 99, then data is read from LBA 3 and LBA 5; and then after a break data is written to LBA 100 to LBA 199, and data is read from LBA 103 and LBA 105; and then after a break data is written to LBA 200 to 299, and then data is read from LBA 203 and LBA 205; and then after a break data is written to LBA 300 to 399, and then data is read from LBA 303 and LBA 305; and then after a break data is written to LBA 400 to 499, and then data is read from LBA 403 and LBA 405; and then after a break data is written to LBA 500 to 599, and then data is read from LBA 503 and LBA 505. Example contents of such an activity log is shown in FIG. 10. Based on the activity log, it can be predicted that data will next be written to LBA 600 to 699, and then read from LBA 603 and 605, or more generally, a second exemplary predicted host activity pattern can be the writing of data to LBAs N*100 to (N*100)+99, and the reading of data from LBAs (N*100)+3 and (N*100)+5, where N is in integer that is incremented. These are just a few examples, that are not intended to be all encompassing.

Returning to the flow diagram of FIG. 5, step 510 involves selected one of the plurality of stored relocation schemes to apply to the data stored in the IS memory. The selecting at step 510 is performed based on the host activity pattern that was predicted at step 508. Exemplary details of how to select one of the plurality of stored relocation schemes to apply to the data stored in the IS memory, at step 508, are described below with reference to FIGS. 7A and 7B.

Next, at step 512, the selected relocation scheme is executed to thereby selectively relocate (i.e., transfer) one or more portions of the data stored in the IS memory (e.g., 132) to the MS memory (e.g., 134). Referring back to the first example above (where the predicted host activity pattern specified that data is written to a specific range of LBAs, then read thirty times before being deleted, and then this activity is repeated 100 times), then the relocation scheme selected at step 510 and executed at step 512 may cause the data that keeps being written, repeatedly read, and then deleted to be stored only in the IS memory (without ever being relocated to the MS memory), and may cause all of the other data that had been stored in the IS memory to be moved to the MS memory.

Figure 11:
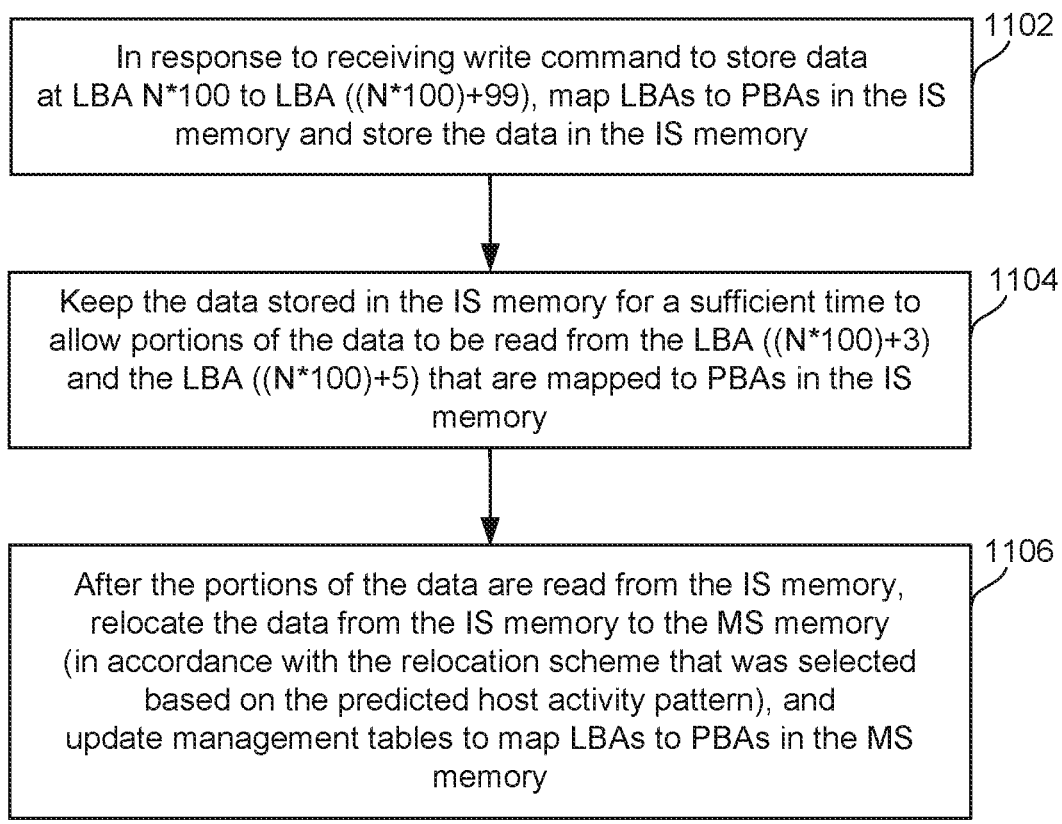
FIG. 11 is a high level flow diagram that provide some additional details of how a relocation scheme, after being selected, can be executed in accordance with an embodiment.

Reference is now made back to the second example, where the predicted host activity pattern was to write data to LBAs N*100 to (N*100)+99, read from LBAs (N*100)+3 and (N*100)+5, and then delete the data. Assuming that the data is always initially stored in the IS memory (e.g., 132), then the relocation scheme selected at step 510 and executed at step 512 may cause the 100 LBAs worth of data to be kept in the IS memory for a sufficient time to allow for the two LBAs (i.e., LBAs (N*100)+3 and (N*100)+5) to be read, and then all 100 LBAs to be relocated to MS memory (e.g., 134). The high level flow diagram of FIG. 11 illustrates some additional details of how such a relocation scheme, after being selected at step 510, can be executed at step 512, in accordance with an embodiment. Referring to FIG. 11, at step 1102, in response to receiving a write command to store data at LBA N*100 to LBA ((N*100)+99), the LBAs are mapped to physical block addresses (PBAs) corresponding the IS memory 132, and the LTP mapping within the management tables 125 is updated accordingly. As indicated at step 1104, the data is kept stored in the IS memory 132 for a sufficient time to allow portions of the data to be read from the LBA ((N*100)+3) and the LBA ((N*100)+5)), which are mapped to PBAs in the IS memory 132. Then, after the portions of the data have been read from the LBA ((N*100)+3) and the LBA ((N*100)+5)), and more generally from the IS memory 132, the data is relocated to the MS memory 134 (in accordance with the relocation scheme that was selected at step 510 based on the predicted host activity pattern), and the LTP mapping within the management tables 125 is updated accordingly.

An alternative relocation scheme that may be selected at step 510 and executed at step 512 may cause only the two LBAs (i.e., LBAs (N*100)+3 and (N*100)+5) that will be read to be kept in the IS memory (e.g., 132) for a sufficient amount of time to enable that portion of the data to be read, while the rest of the data is substantially immediately relocated to the MS memory (e.g., 134), and then after the two LBAs (i.e., LBAs (N*100)+3 and (N*100)+5) are read for the IS memory they are also relocated to the MS memory. These are just a few examples, which are not meant to be all encompassing.

Figure 12:
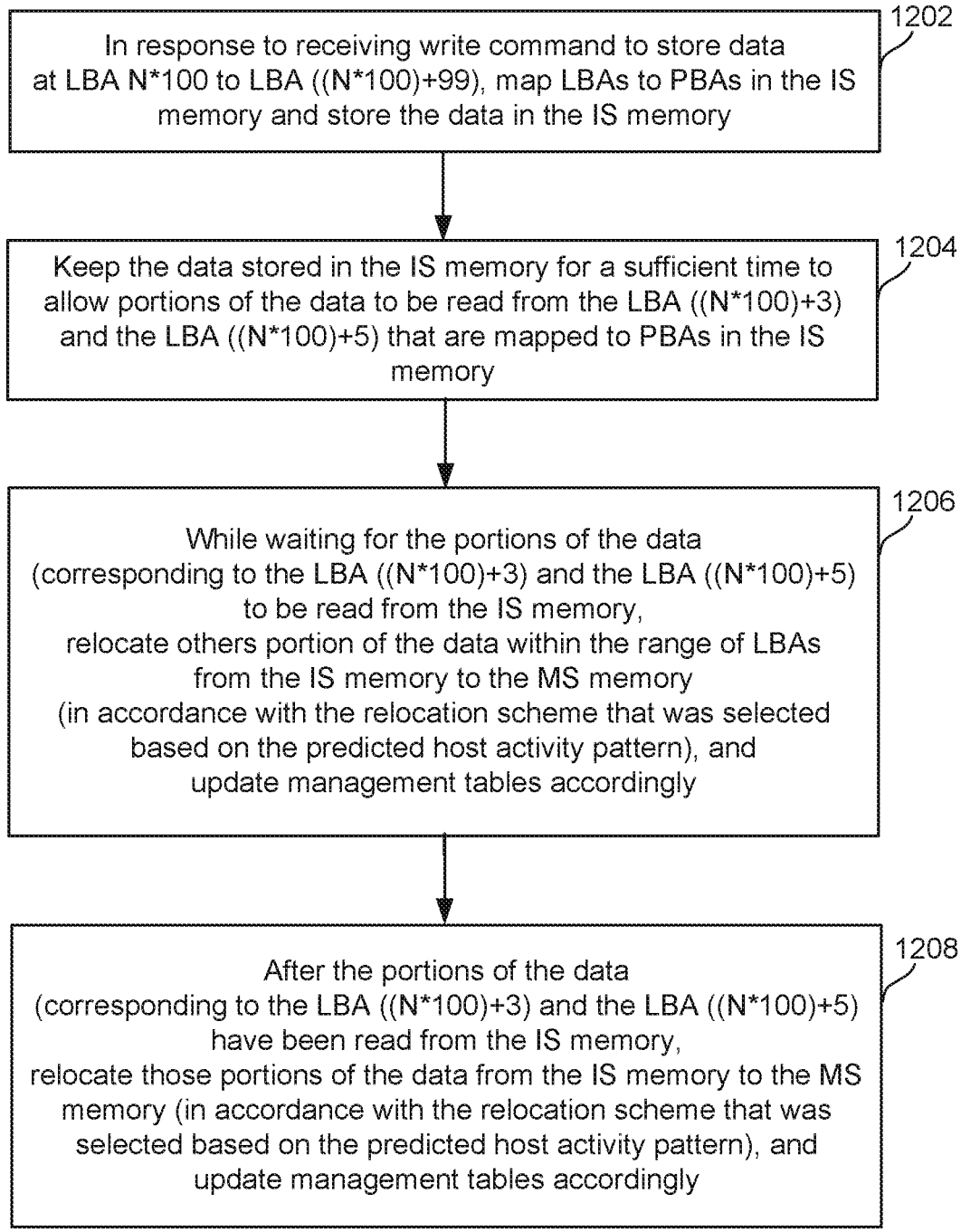
FIG. 12 is a high level flow diagram that provide some additional details of how an alternative relocation scheme, after being selected, can be executed in accordance with an embodiment.

The high level flow diagram of FIG. 12 illustrates some additional details of how such an alternative relocation scheme, after being selected at step 510, can be executed at step 512, in accordance with an embodiment. Referring to FIG. 12, at step 1202, in response to receiving a write command to store data at LBA N*100 to LBA ((N*100)+99), the LBAs are mapped to physical block addresses (PBAs) corresponding the IS memory 132, and the LTP mapping within the management tables 125 is updated accordingly. As indicated at step 1204, the data is kept stored in the IS memory 132 for a sufficient time to allow portions of the data to be read from the LBA ((N*100)+3) and the LBA ((N*100)+5)), which are mapped to PBAs in the IS memory 132. As indicated at step 1206, while waiting for the portions of the data (corresponding to the LBA ((N*100)+3) and the LBA ((N*100)+5) to be read from the IS memory, others portion of the data within the range of LBAs (from LBA N*100 to LBA ((N*100)+99)) are relocated from the IS memory 132 to the MS memory 134 (in accordance with the relocation scheme that was selected based on the predicted host activity pattern), and the management tables 125 are accordingly updated. Then, after the portions of the data (corresponding to the LBA ((N*100)+3) and the LBA ((N*100)+5) have been read from the IS memory 132, those portions of the data are relocated from the IS memory 132 to the MS memory 134 (in accordance with the relocation scheme that was selected based on the predicted host activity pattern), and the management tables are updated accordingly to map the LBAs to PBAs in the MS memory 134. Whether the relocation scheme generally described with reference to FIG. 11 or the relocation scheme generally described with reference to FIG. 12 is the one that is associated with a particular predicted host activity pattern (and thus, is selected at step 510) may depend on the cost function used to generate the relocations schemes, and the costs (e.g., latency and power consumption costs) associated with the various operations related to writing and reading data to and from the IS memory 132 and the MS memory 134, and the costs associated with relocating data from the IS memory 132 to the MS memory 134, but is not limited thereto.

Figure 6:
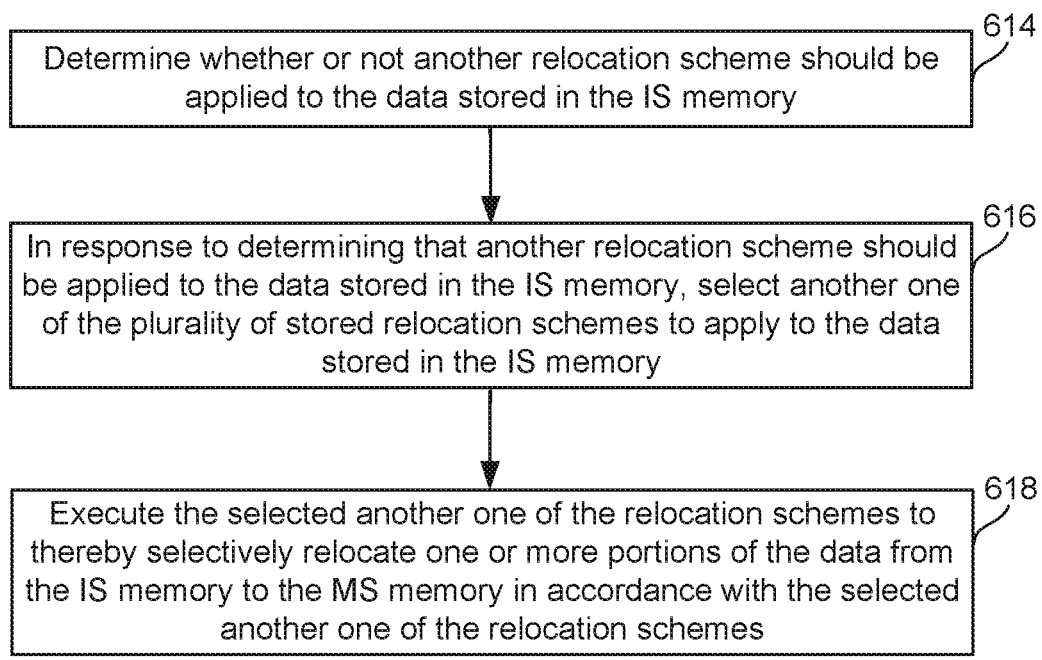
FIG. 6 is a high level flow diagram that is used explain how the relocation scheme that is selected and executed may change over time.

Referring now to FIG. 6, in accordance with certain embodiments of the present technology, from time to time (e.g., periodically, or based on some periodic or aperiodic trigger event) there is a determination at step 614 of whether or not another relocation scheme should be applied to the data stored in the IS. As indicated at step 616, in response to determining that another relocation scheme should be applied to the data stored in the IS memory, another one of the plurality of stored relocation schemes is selected to apply to the data stored in the IS memory. Then, at step 618, the selected another one of the relocation schemes is executed to thereby selectively relocate one or more portions of the data from the IS memory to the MS memory in accordance with the selected another one of the relocation schemes. In accordance with certain embodiments, step 614 is performed by determining, based on the activity log (to which entries are added whenever write and read operations are performed), whether the predicted host activity has changed, and if it has changed, whether a different relocation scheme should be selected (based on the newly or changed predicted host activity) and then executed. Predicted host activity may change where the user of the host changes their behavior, e.g., by switching from using the host to stream a video to using the host to perform a simulation.

Steps 614, 616 and 618, described with reference to FIG. 6, can occur after steps 508, 510 and 512 described with reference to FIG. 5. In accordance with certain embodiments, steps 614, 616 and 618 can actually be further instances, respectively, of steps 508, 510 and 512. More specifically, referring back to FIG. 5, after step 512 is performed another instance of step 508 can be performed, and if the predicted host activity pattern has changed (i.e., if there is a new predicted host activity pattern), then another relocation scheme can be selected at another instance of step 510 and executed at another instance of step 512. Such a return to step 508 is represented by the dashed arrowed line 513. Further, as noted above, the activity log(s) stored at step 504 can be continually updated as additional write and/or read operations are performed, and the data stored in the IS memory at step 506 can continually change in response to write commands received from the host as well as based on portions the data being stored in the IS memory being relocated to the MS memory at instances of step 512.

Figure 7A:
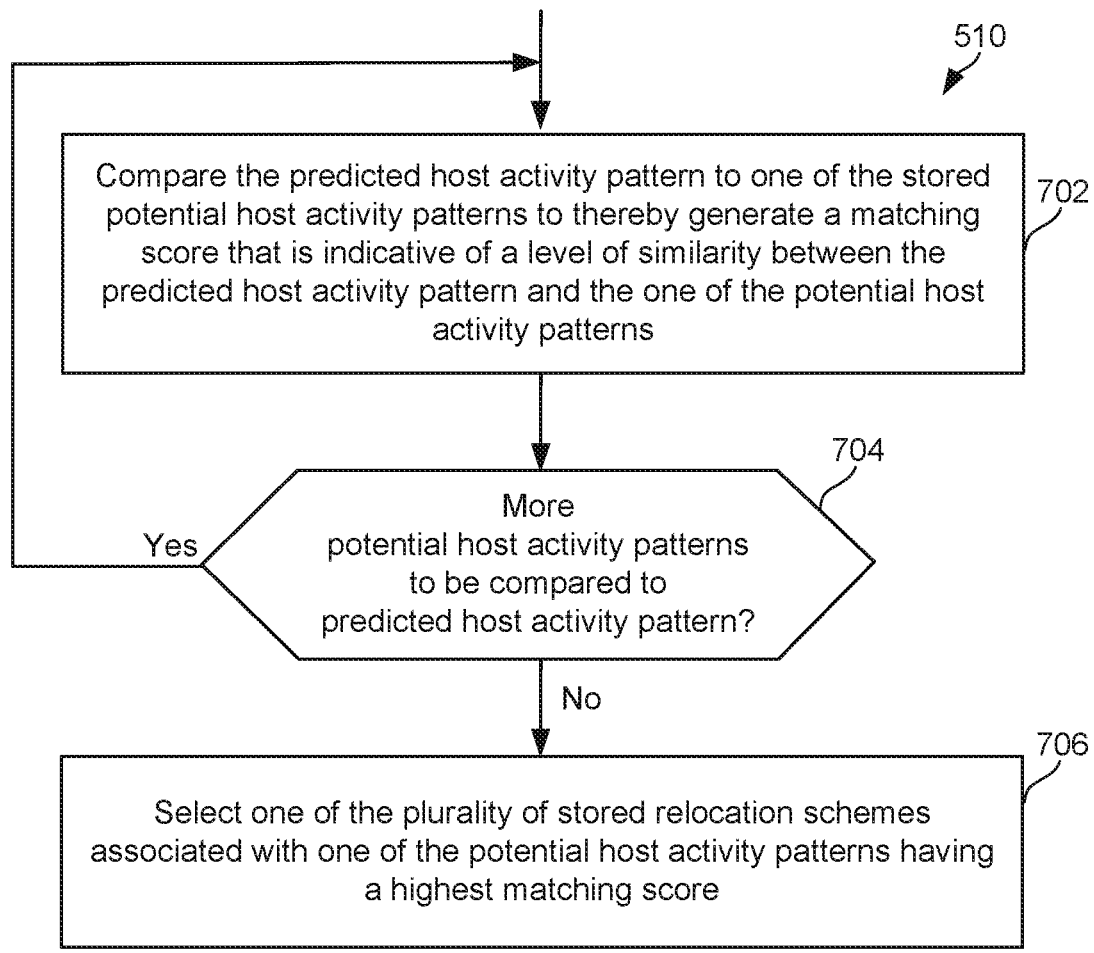
FIG. 7A is a flow diagram that is used to describe additional details of one of the steps introduced in FIG. 5, which step involves selecting one of a plurality of stored relocation schemes that are used to selectively relocate data from IS memory to MS memory, according to an embodiment of the present technology.

FIG. 7A will now be used to described additional details of step 510, according to an embodiment of the present technology. More specifically, FIG. 7A will be used to describe how one of the stored relocation schemes can be selected based on a predicted host activity pattern. Referring to FIG. 7A, at step 702, the predicted host activity pattern is compared to one of the stored potential host activity patterns to thereby generate a matching score that is indicative of a level of similarity between the predicted host activity pattern and the one of the potential host activity patterns. As can be appreciated from steps 704 and 702, such comparisons are repeated until a matching score is determined for each of the stored potential host activity patterns, and then, at step 706 the relocation scheme that is associated with the potential host activity pattern having a highest matching score is selected.

Figure 7B:
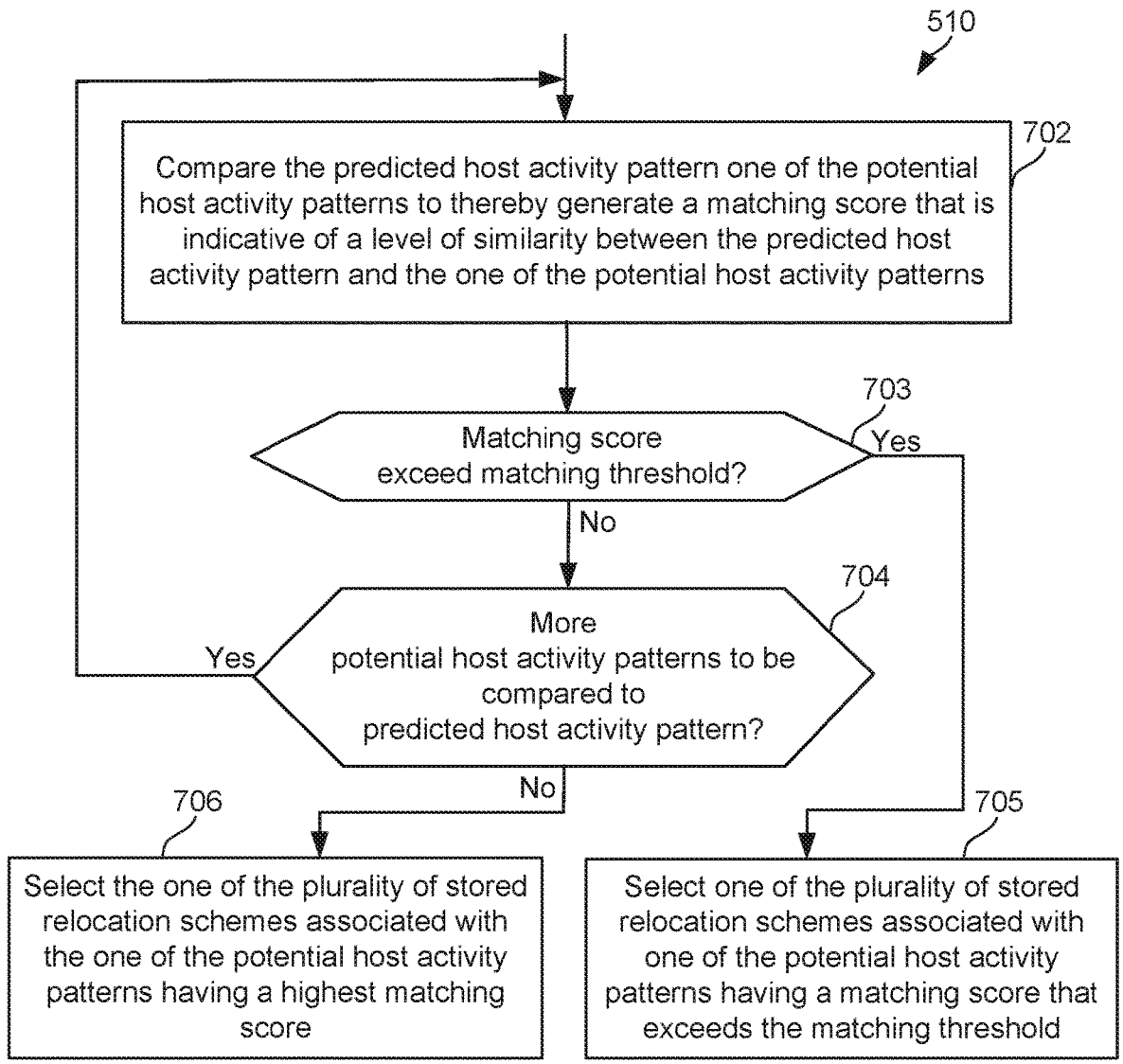
FIG. 7B is a flow diagram that is used to describe additional details of one of the steps introduced in FIG. 5, which step involves selecting one of a plurality of stored relocation schemes that are used to selectively relocate data from IS memory to MS memory, according to another embodiment of the present technology.

FIG. 7B will now be used to described additional details of step 510, according to another embodiment of the present technology. Referring to FIG. 7B, at step 702 (which is the same as step 702 in FIG. 7A), the predicted host activity pattern is compared to one of the stored potential host activity patterns to thereby generate a specified matching score that is indicative of a level of similarity between the predicted host activity pattern and the one of the potential host activity patterns. Next, at step 703 there is a determination of whether the matching score exceeds a matching threshold. If the matching score exceeds the matching threshold, then the stored relocation scheme that is associated with the potential host activity pattern having the matching score that exceeds the threshold is selected at step 705. If the matching score does not exceed the matching threshold, then as can be appreciated from steps 704 and 702, such comparisons are repeated, until either one of the potential host activity patterns has a matching score that exceeds the matching threshold and is selected at step 705, or until all of the potential host activity patterns have been compared to the predicted host activity pattern, and if none have a matching score that exceeds the matching threshold, the potential host activity pattern having a highest matching score is selected at step 706. In the embodiment described with reference to FIG. 7B, the relocation scheme associated with the first potential host activity pattern determined to have a matching score that exceeds a specified matching threshold is selected. More generally, in accordance with certain embodiments, a relocation scheme associated with any one of the potential host activity patterns determined to have a matching score that exceeds a specified matching threshold may be selected. Alternatively, or additionally, the relocation scheme associated with the potential host activity patterns determined to have a highest matching score may be selected. Other variations are also possible while still being with the scope of the embodiments described herein. In other words, referring back to FIG. 5, at step 510, the one of the plurality of stored relocation schemes that is selected based on results of the comparisons can involve either selecting the one of the plurality of stored relocation schemes associated with the one of the potential host activity patterns having a highest matching score, or selecting any one of the plurality of stored relocation schemes associated with a stored potential host activity pattern for which the matching score exceeds the specified matching threshold.

Figure 8:
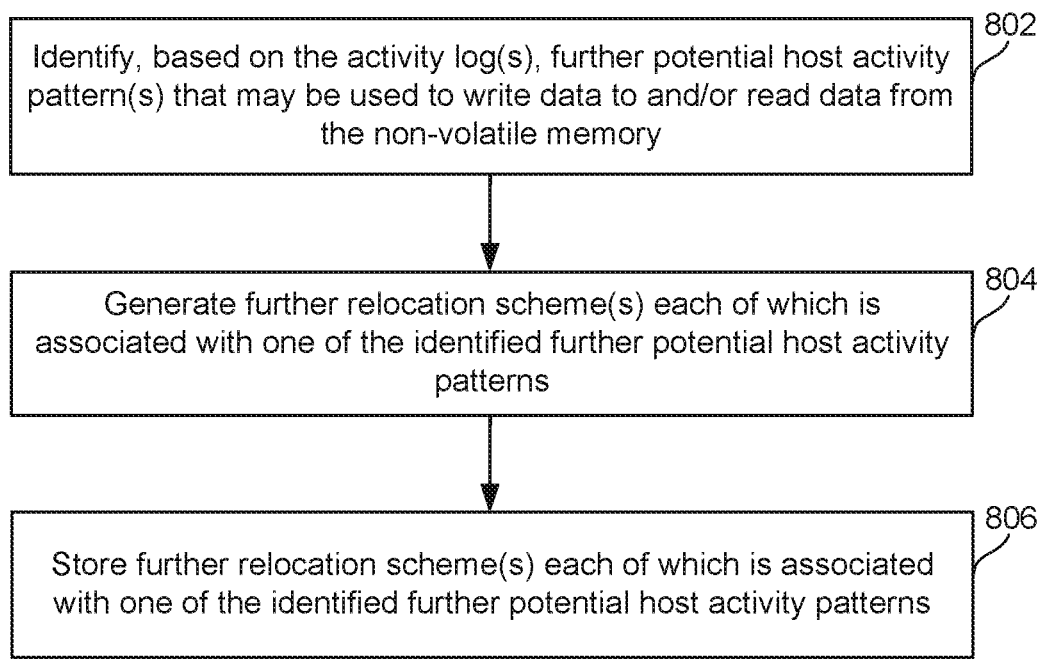
FIG. 8 is a flow diagram that is used to explain how further potential host activity patterns can be identified and further relocations schemes can be generated and stored in accordance with certain embodiments of the present technology.

Referring now to FIG. 8, in accordance with certain embodiments of the present technology, from time to time one or more further potential host activity patterns, which can be used to write data to and/or read data from the non-volatile memory, can be identified at step 802 based on the activity log, which as noted above, gets continually updated. Still referring to FIG. 8, at step 804 a further relocation scheme can be generated for each of the identified further potential host activity patterns, and at step 806 the further relocation scheme(s) is/are stored along with the associated further potential host activity patterns. The further relocation scheme(s), after being generated and stored, are thereafter available for selection and execution by the IS manager 334. As was described above with reference to the flow diagram of FIG. 5, the initial plurality of potential host activity patterns (and associated relocation schemes) that were stored at step 502 could have been identified and stored in the storage device 120 during a one-time initial configuration of the storage device 120, e.g., after the storage device 120 was been manufactured but before the storage device 120 was yet distributed for sale. By contrast, steps 802, 804 and 806 are performed after the storage device 120 is already being used by a host device 102 to write and read data to and from the non-volatile memory 124 of the storage device 120.

In accordance with certain embodiments, the memory controller 122 or the IS manager 334 thereof can determine that it is appropriate to identify further potential host activity patterns when comparisons between a predicted host activity pattern and the stored potential host activity patterns do not produce any matching scores that exceeds a specified matching threshold. This would provide for a likely indication that none of the stored relocation schemes are substantially optimized for the data stored in the IS memory. Alternatively, or additionally, further potential host activity patterns can be identified periodically or aperiodically in response to some other type of trigger. In certain embodiments, a further potential host activity pattern can simply be a predicted host activity pattern for which there does not already exist a similar stored potential host activity pattern (e.g., a predicted host activity pattern for which no matching score exceeded a specified matching threshold). In other embodiments, further potential host activity patterns can be more generally identified based on reoccurring patterns identified from the stored activity log. In certain embodiments further potential host activity patterns and further relocations schemes associated therewith are identified and generated by the storage device 120 itself, e.g., by the memory controller 122 or the IS manager 334 thereof. In other embodiments, further potential host activity patterns and further relocations schemes associated therewith can be uploaded to the stored device 120 during a firmware upgrade, or the like.

The memory controller 122 or the IS manager 334 thereof can generate a further relocation scheme associated with an identified further potential host activity pattern by optimizing a cost function. An exemplary cost function may attempt to minimize or otherwise take into account costs associated with reading data from IS memory, transferring (i.e., relocating) data from IS memory to MS memory, and reading data from MS memory, but is not limited thereto. Costs may be in terms of latency and/or power consumption, but is not limited thereto. This is just one example of a cost function, which is not intended to be all encompassing.

In accordance with certain embodiments of the present technology, the processes that are performed to achieve adaptive management of IS memory are performed as background processes. This can include the processes that are used to predict a host activity pattern based on an activity log, select one of a plurality of stored relocation schemes based on the predicted host activity pattern, and execute the selected relocation scheme. Other processes that can be performed as background processes can include processes that are used to determine whether or not another relocation scheme should be applied, and selecting and executing another relocation scheme. Further processes that can be performed as background processes can include processes that are used to identify further potential host activity patterns, and used to generate and store further relocations schemes associated with the further potential host activity patterns.

Embodiments of the present technology described herein should increase read and write throughput for most users, and should also result in less blocks being used for overprovisioning. This should beneficially have the effect of increasing endurance and reducing power consumption.

Certain embodiments of the present technology relate to a storage device that receives read and write commands from a host, wherein the storage device includes non-volatile memory and an intermediate storage (IS) manager. The non-volatile memory includes a portion of which is designated as intermediate storage (IS) memory and another portion of which designated as main storage (MS) memory, wherein the IS memory has lower write and read latencies than the MS memory, the IS memory has greater endurance than the MS memory, and the IS memory has lower storage density and capacity than the MS memory. The IS manager is configured to predict host activity and select and execute a relocation scheme based on the predicted host activity, to thereby selectively relocate one or more portions of data from the IS memory to the MS memory in accordance with the selected relocation scheme. In accordance with certain embodiments, the IS memory includes single-level cell (SLC) type flash memory wherein a single bit of data is stored per memory cell, and the MS memory includes multi-level cell (MLC) type flash memory wherein two or more bits of data are stored per memory cell.

The storage device can include a memory controller in communication with the non-volatile memory, wherein the memory controller is configured to determine whether data that is stored in the non-volatile memory in response to write commands received from the host is to be stored in the IS memory or the MS memory. The IS manager can be implemented by the memory controller. Alternatively, the IS controller can be implemented by another component of the storage device that is in communication with the memory controller.

The storage device can also include random access memory (RAM) with which the IS manager and/or the memory controller are in communication with. In accordance with certain embodiments, an activity log, which keeps track of write and read operations performed for the host, is stored in at least one of the RAM or the non-volatile memory, and the IS manager is configured to predict host activity based on the activity log. The predicted host activity, which the IS manager predicts based on the activity log, can include at least one of a predicted write pattern, a predicted read pattern, and/or a predicted write and read pattern.

In accordance with certain embodiments, a plurality of relocation schemes are stored in the non-volatile memory, ROM and/or RAM of the storage device, with each of the relocation schemes associated with one of a plurality of potential host activity patterns. In such embodiments, the IS manager can be configured to select one of the plurality of relocation schemes based on results of comparisons between the predicted host activity pattern and at least some of the plurality of potential host activity patterns. The potential and predicted host activity patterns, in accordance with certain embodiments, are specified in terms of logical block addresses (LBAs) or LBA ranges.

In accordance with certain embodiments, the IS manager is configured to update the predicted host activity pattern from time to time and select and execute another relocation scheme based on the updated predicted host activity.

In accordance with certain embodiments, the IS manager is configured to identify and store, based on the activity log, further potential host activity patterns, and generate and store further relocation schemes each of which is associated with one of the identified further potential host activity patterns. Such further relocation schemes are available for selection and execution by the IS manager after being generated and stored.

Certain embodiments of the present technology are related to methods for use by a storage device that receives read and write commands from a host and that includes non-volatile memory and a memory controller in communication with the non-volatile memory, wherein the non-volatile memory includes a portion designated as IS memory and another portion designated as MS memory. As noted above, the IS memory has lower write and read latencies, greater endurance, and lower storage density and capacity than the MS memory. In accordance with certain embodiments, such a method includes storing a plurality of relocation schemes each of which is associated with one of a plurality of potential host activity patterns, and maintaining one or more activity logs that keep track of operations related to data stored in the non-volatile memory. The method also includes storing data in the IS memory in response to receiving one or more write commands from a host. The method further includes predicting a host activity pattern based on the activity log(s), and selecting one of the plurality of stored relocation schemes to apply to the data stored in the IS memory. The selecting is performed based on the predicted host activity pattern. The method further includes executing the selected relocation scheme to thereby selectively relocate one or more portions of the data from the IS memory to the MS memory in accordance with the selected relocation scheme.

In accordance with certain embodiments, the activity log(s) that is/are maintained keep track of write and read operations performed for the host, and the predicted host activity, which is predicted based on the activity log, includes at least one of a predicted write pattern, a predicted read pattern, or a predicted write and read pattern. The selecting one of the plurality of stored relocation schemes to apply to the data stored in the IS memory can involve comparing the predicted host activity pattern to at least some of the plurality of potential host activity patterns that are each associated with one of the relocation schemes, and selecting one of the plurality of stored relocation schemes based on results of the comparisons.

In accordance with certain embodiments, the comparing the predicted host activity pattern to at least some of the plurality of stored potential host activity patterns includes, for each of the comparisons, generating a matching score that is indicative of a level of similarity between the predicted host activity pattern and one of the potential host activity patterns. In such embodiments, the selecting one of the plurality of stored relocation schemes based on results of the comparisons can include either selecting the one of the plurality of stored relocation schemes associated with the potential host activity pattern having a highest matching score, or selecting a stored relocation scheme associated with any one (e.g., a first one) of the potential host activity patterns for which the matching score exceeds a specified matching threshold.

In accordance with certain embodiments, the method also includes determining whether or not another relocation scheme should be applied to the data stored in the IS memory. In response to determining that another relocation scheme should be applied to the data stored in the IS memory, another one of the plurality of stored relocation schemes is selected to apply to the data stored in the IS memory, wherein the selecting is based on a new predicted write pattern. The selected another one of the relocation schemes is then executed to thereby selectively relocate one or more portions of the data from the IS memory to the MS memory in accordance with the selected another one of the relocation schemes.

In accordance with certain embodiments, the method also includes identifying, based on the activity log, one or more further potential host activity patterns, and generating and storing one or more further relocation schemes each of which is associated with one of the identified further potential host activity pattern(s). The further relocation scheme(s), after being generated and stored, is/are available for selection and execution.

In accordance with certain embodiments, a storage device includes non-volatile memory including a portion of which is designated as IS memory and another portion of which designated as MS memory. The IS memory has lower write and read latencies than the MS memory, the IS memory has greater endurance than the MS memory, and the IS memory has lower storage density and capacity than the MS memory. The storage device also includes means for predicting a host activity pattern based on write and read operations that are performed for a host, means for selecting one of a plurality potential relocation schemes based on the predicted host activity pattern, and means for executing the selection one of the plurality of potential relocation schemes to thereby selectively relocate at least a portion of data stored in the IS memory to the MS memory. The means for predicting the host activity pattern can be the IS manager 334 and/or the memory controller 122, and/or some other discrete component 340. The means for selecting one of the plurality potential relocation schemes based on the predicted host activity pattern can be the IS manager 334 and/or the memory controller 122, and/or some other discrete component 340. The means for executing the selection one of the plurality of potential relocation schemes can be the IS manager 334 and/or the memory controller 122, and/or some other discrete component 340. Any one or more of the above described means can take the form of a packaged functional hardware unit (e.g., an electrical circuit) designed for use with other components, program code (e.g., software or firmware) executable by a (micro) processor or processing circuitry that usually performs a particular function of related functions, or a self-contained hardware or software component that interfaces with a larger system. For example, each means may include an application specific integrated circuit (ASIC), a Field Programmable Gate Array (FPGA), an electrical circuit, a digital logic circuit, an analog circuit, a combination of discrete circuits, gates, or any other type of hardware or combination thereof. Alternatively or in addition, each means may include software stored in a processor readable device (e.g., memory) to program a processor to perform the functions described herein.

In accordance with certain embodiments, the storage device also includes means for keeping track of write or read operations performed for the host. The means for keeping track of write or read operations can be an activity log. Such an activity log can be stored in non-volatile memory 124 and/or in RAM 206. In such embodiments, the means for predicting the host activity pattern can predict the host activity pattern using the means for keeping track of write or read operations performed for the host. Further, the means for predicting the host activity pattern can be configured to update the predicted host activity pattern, in response to which the means for selecting one of the plurality potential relocation schemes will select another one of the plurality of potential relocation schemes, and in response to which the means for executing will execute the selected another one of the plurality of potential relocation schemes.

In accordance with certain embodiments, the storage device includes means for identifying a further potential host activity pattern, and means for generating a further relocation scheme for the further potential host activity patterns. After being generated the further relocation scheme is available for selecting by the means for selecting, and is available for execution by the means for executing. The means for identifying a further potential host activity pattern can be the IS manager 334 and/or the memory controller 122, and/or some other discrete component 340. The means for generating the further relocation scheme can be the IS manager 334 and/or the memory controller 122, and/or some other discrete component 340. Any one or more of the above described means can take the form of a packaged functional hardware unit (e.g., an electrical circuit) designed for use with other components, program code (e.g., software or firmware) executable by a (micro) processor or processing circuitry that usually performs a particular function of related functions, or a self-contained hardware or software component that interfaces with a larger system. For example, each means may include an application specific integrated circuit (ASIC), a Field Programmable Gate Array (FPGA), an electrical circuit, a digital logic circuit, an analog circuit, a combination of discrete circuits, gates, or any other type of hardware or combination thereof. Alternatively or in addition, each means may include software stored in a processor readable device (e.g., memory) to program a processor to perform the functions described herein.

For the purpose of this document, the terms "write" and "store" are often used interchangeably, as are the terms "writing" and "storing."

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the terms "based on" and "in dependence on" may be read as "based at least in part on."

While various embodiments of the present technology have been described above, it should be understood that they have been presented by way of example, and not limitation. It will be apparent to persons skilled in the relevant art that various changes in form and detail can be made therein without departing from the spirit and scope of the technology. For example, although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flow depicted in the accompanying figures and/or described herein do not require the particular order shown, or sequential order, to achieve desirable results. Other embodiments may be within the scope of the following claims.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed technology. One skilled in the art will recognize that these functional building blocks can be implemented by discrete components, application specific integrated circuits, processors executing appropriate software and the like or any combination thereof.

The breadth and scope of the present technology should not be limited by any of the above-described exemplary embodiments, but should be defined only in accordance with the following claims and their equivalents.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A storage device that receives read and write commands from a host, the storage device comprising:
   non-volatile memory including a portion of which is designated as intermediate storage (IS) memory and another portion of which designated as main storage (MS) memory, wherein the IS memory has lower write and read latencies, greater endurance, and lower storage density and capacity than the MS memory; and
   an intermediate storage (IS) manager configured to
      predict a host activity pattern based on at least one of one or more activity logs that keep track of at least one of read or write operations performed for the host, wherein the predicted host activity pattern is specified at least in part in terms of logical block addresses (LBAs) and/or LBA ranges;

perform comparisons between the predicted host activity pattern and a plurality of stored potential host activity patterns to thereby produce a plurality of matching scores each indicative of a level of similarity between the predicted host activity pattern and a respective one of the plurality of stored potential host activity patterns, wherein each of the plurality of stored potential host activity patterns is specified at least in part in terms of LBAs and/or LBA ranges and is associated with one of a plurality of stored relocation schemes;

select one of the plurality of stored relocation schemes based on the matching scores resulting from the comparisons, so long as at least one of the matching scores exceeds a specified matching threshold;

in response to none of the matching scores exceeding the specified matching threshold, generate and store a further relocation scheme associated with a further potential host activity pattern, wherein the further relocation scheme after being generated and stored is available for selection and execution; and execute the selected relocation scheme to thereby selectively relocate one or more portions of data from the IS memory to the MS memory in accordance with the selected relocation scheme.

2. The storage device of claim 1, wherein:
the storage device includes a memory controller in communication with the non-volatile memory;
the memory controller is configured to determine whether data that is stored in the non-volatile memory in response to write commands received from the host is to be stored in the IS memory or the MS memory; and
the IS manager is implemented by the memory controller or by another component of the storage device that is in communication with the memory controller.

3. The storage device of claim 1, wherein:
the storage device also comprises random access memory (RAM);
the one or more activity logs is/are stored in at least one of the RAM or the non-volatile memory;
the IS manager is configured to predict the host activity pattern based on the at least one of the one or more activity logs; and
the predicted host activity pattern, which the IS manager predicts based on the at least one of the one or more activity logs, comprises at least one of a predicted write pattern, a predicted read pattern, or a predicted write and read pattern.

4. The storage device of claim 1, further comprising
random access memory (RAM); and
read only memory (ROM);
wherein the plurality of stored relocation schemes are stored in at least one of the RAM, the ROM or the non-volatile memory, with each of the stored relocation schemes associated with one of a plurality of potential write patterns; and
wherein the IS manager is configured to select one of the plurality of stored relocation schemes based on results of comparisons between the predicted write pattern and at least some of the plurality of potential write patterns.

5. The storage device of claim 1, wherein the potential and predicted host activity patterns are specified in terms of at least one of LBAs or LBA ranges.

6. The storage device of claim 1, wherein:
the IS memory comprises single-level cell (SLC) type flash memory wherein a single bit of data is stored per memory cell; and the MS memory comprises multi-level cell (MLC) type flash memory wherein two or more bits of data are stored per memory cell.

7. The storage device of claim 1, wherein the IS manager is configured to update the predicted host activity pattern from time to time and select and execute another relocation scheme based on the updated predicted host activity pattern.

8. The storage device of claim 1, wherein:
the IS manager is configured to identify and store, based on one or more reoccurring patterns in at least one of the one or more activity logs, one or more additional potential host activity patterns, and generate and store one or more additional relocation schemes each of which is associated with a respective one of the identified one or more additional potential host activity patterns;
the one or more additional location schemes are generated using a cost function that takes into account latency and power consumption costs associated with operations related to writing and reading data to and from the IS memory and the MS memory;
the one or more additional potential host activity patterns are available for comparison by the IS manager after being identified and stored; and
the one or more additional relocation schemes are available for selection and execution by the IS manager after being generated and stored.

9. The storage device of claim 1, wherein the IS storage manager is configured to generate the further relocation scheme using a cost function that takes into account latency and power consumption costs associated with operations related to writing and reading data to and from the IS memory and the MS memory.

10. A method for use by a storage device that receives read and write commands from a host and that includes non-volatile memory and a memory controller in communication with the non-volatile memory, wherein the non-volatile memory includes a portion designated as intermediate storage (IS) memory and another portion designated as main storage (MS) memory, wherein the IS memory has lower write and read latencies, greater endurance, and lower storage density and capacity than the MS memory, the method comprising:
storing a plurality of relocation schemes each of which is associated with one of a plurality of potential host activity patterns;
maintaining one or more activity logs that keep track of operations related to data stored for a host in the non-volatile memory;
storing data in the IS memory in response to receiving one or more write commands from the host;
predicting a host activity pattern based on at least one of one or more activity logs, wherein the predicted host activity pattern is specified at least in part in terms of logical block addresses (LBAs) and/or LBA ranges;
performing comparisons between the predicted host activity pattern and at least some of the plurality of potential host activity patterns;
selecting one of the plurality of stored relocation schemes to apply to the data stored in the IS memory, wherein the selecting is performed based on results of the comparisons;
executing the selected relocation scheme to thereby selectively relocate one or more portions of the data from the IS memory to the MS memory in accordance with the selected relocation scheme; and identifying and storing, based on at least one of the one or more activity logs, one or more further potential host activity patterns, and generating and storing one or more further relocation schemes each of which is associated with a respective one of the identified one or more further potential host activity patterns;

wherein the one or more further potential host activity patterns are generated using a cost function that takes into account latency and power consumption costs associated with operations related to writing and reading data to and from the IS memory and the MS memory;

wherein the one or more further potential host activity patterns are available for performing comparisons after being identified and stored; and wherein the one or more further relocation schemes are available for selection and execution after being generated and stored.

11. The method of claim 10, wherein:

the one or more activity logs keep track of at least one of write or read operations performed for the host; and the predicted host activity, which is predicted based on at least one of the one or more activity logs, comprises at least one of a predicted write pattern, a predicted read pattern, or a predicted write and read pattern.

12. The method of claim 10, wherein:

the comparing the predicted host activity pattern to at least some of the plurality of stored potential host activity patterns includes, for each of the comparisons, generating a matching score that is indicative of a level of similarity between the predicted host activity pattern and one of the potential host activity patterns;

the selecting one of the plurality of stored relocation schemes based on results of the comparisons is performed so long as at least one of the matching scores exceeds a specified matching threshold; and in response to none of the matching scores exceeding the specified matching threshold, generating and storing an additional relocation scheme associated with an additional potential host activity pattern, wherein the additional relocation scheme after being generated and stored is available for the selecting and the executing.

13. The method of claim 10, further comprising:

determining whether or not another one of the stored relocation schemes should be applied to the data stored in the IS memory;

in response to determining that another one of the stored relocation schemes should be applied to the data stored in the IS memory, selecting another one of the plurality of stored relocation schemes to apply to the data stored in the IS memory, the selecting based on a new predicted write pattern; and executing the selected another one of the relocation schemes to thereby selectively relocate one or more portions of the data from the IS memory to the MS memory in accordance with the selected another one of the relocation schemes.

14. The method of claim 10, wherein the selecting one of the plurality of stored relocation schemes based on results of the comparisons includes:

selecting one of the plurality of stored relocation schemes associated with one of the plurality of stored potential host activity patterns having one of a highest matching score, or a matching score that exceeds a specified matching threshold.

15. The method of claim 10, wherein the potential and predicted host activity patterns are specified in terms of at least one of LBAs or LBA ranges.

16. A storage device, comprising:

non-volatile memory including a portion of which is designated as intermediate storage (IS) memory and another portion of which designated as main storage (MS) memory;

means for predicting a host activity pattern based on write and read operations that are performed for a host;

means for generating a plurality of matching scores each indicative of a level of similarity between the predicted host activity pattern and a respective one of a plurality of stored potential host activity patterns, wherein each of the plurality of potential host activity patterns is associated with one of a plurality of potential relocation schemes;

means for selecting a relocation scheme, from the plurality of potential relocation schemes, such that the selected relocation scheme corresponds to the one of the plurality of stored potential host activity patterns being a first to exceed a specified matching threshold;

means for executing the selected relocation scheme to thereby relocate at least some data from the IS memory to the MS memory; and means for generating a further relocation scheme for a further potential host activity pattern, when none of the stored potential host activity patterns result in a matching score that exceeds the specified matching threshold, wherein after being generated the further relocation scheme is available for selecting by the means for selecting, and is available for execution by the means for executing.

17. The storage device of claim 16, further comprising:

means for keeping track of write and read operations performed for the host;

wherein the means for predicting the host activity pattern predicts the host activity pattern using the means for keeping track of write and read operations performed for the host.

18. The storage device of claim 16, wherein the means for predicting the host activity pattern is configured to update the predicted host activity pattern, in response to which the means for selecting one of the plurality potential relocation schemes will select another one of the plurality of potential relocation schemes, and in response to which the means for executing will execute the selected another one of the plurality of potential relocation schemes.

19. The storage device of claim 16, wherein:

the means for generating the further relocation scheme for the further potential host activity pattern uses a cost function that takes into account costs, in terms of at least one of latency or power consumption, associated with reading data from the IS memory, relocating data from the IS memory to the MS memory, and reading data from the MS memory.

20. The storage device of claim 16, wherein:

a single bit of data is stored per memory cell of the IS memory;

two or more bits of data are stored per memory cell of the MS memory; and the IS memory has lower write and read latencies, greater endurance, and lower storage density and capacity than the MS memory.

* * * * *